US009952622B2

(12) United States Patent
Kim et al.

(10) Patent No.: US 9,952,622 B2
(45) Date of Patent: Apr. 24, 2018

(54) FOLDABLE ELECTRONIC DEVICE

(71) Applicant: SAMSUNG ELECTRONICS CO., LTD., Suwon-si, Gyeonggi-do (KR)

(72) Inventors: Seonil Kim, Gwacheon-si (KR); Hongil Kwon, Yongin-si (KR); Kicheol Sung, Seoul (KR); Young-Min Joo, Seoul (KR); Seonghun Choi, Suwon-si (KR); Kyungjung Kim, Suwon-si (KR); Seongeun Kim, Hwaseong-si (KR); Jung-Sik Park, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/584,388

(22) Filed: May 2, 2017

(65) Prior Publication Data
US 2017/0351297 A1 Dec. 7, 2017

(30) Foreign Application Priority Data
Jun. 1, 2016 (KR) .................. 10-2016-0068112

(51) Int. Cl.
H04M 1/00 (2006.01)
G06F 1/16 (2006.01)
H05K 5/02 (2006.01)

(52) U.S. Cl.
CPC .............. *G06F 1/1616* (2013.01); *G06F 1/16* (2013.01); *H05K 5/02* (2013.01)

(58) Field of Classification Search
CPC ............ G06F 1/16; G06F 1/1616; H05K 5/02

USPC ....................................................... 455/575.3
See application file for complete search history.

(56) References Cited

U.S. PATENT DOCUMENTS

| 6,697,022 | B2* | 2/2004 | Ponce De Leon ..... H01Q 1/243 343/702 |
| 8,798,694 | B2* | 8/2014 | Morishita .............. H01Q 1/243 455/575.3 |
| 9,136,590 | B2* | 9/2015 | Hotta ..................... H01Q 1/243 |
| 2015/0326053 | A1 | 11/2015 | Amano et al. |

* cited by examiner

Primary Examiner — Eugene Yun
(74) Attorney, Agent, or Firm — Nixon & Vanderhye, P.C.

(57) ABSTRACT

An electronic device is provided. The electronic device includes a housing including a first housing including a first surface facing a first direction, a second surface facing a second direction opposite the first direction, and a first side surface at least partially surrounding a space between the first surface and the second surface, and a second housing including a first surface that is capable of being oriented to face the first surface of the first housing portion, a second surface facing a direction opposite to the first surface, and a second side surface at least partially surrounding a space between the first surface and the second surface, a connection (hinge, joint, or the like) coupling the first housing and the second housing, a communication circuit arranged within the first housing, a ground arranged within the first housing, a first conductive member extending along at least a part of the first side surface, and a second conductive member extending along at least a part of the second side surface.

15 Claims, 9 Drawing Sheets

FOLDABLE ELECTRONIC DEVICE

CROSS-REFERENCE TO RELATED APPLICATION

This application is based on and claims priority under 35 U.S.C. § 119 to a Korean Patent Application filed in the Korean Intellectual Property Office on Jun. 1, 2016 and assigned Serial No. 10-2016-0068112, the disclosure of which is incorporated by reference herein in its entirety.

BACKGROUND

1. Field of the Disclosure

The present disclosure relates generally to a foldable electronic device and for example, to a foldable electronic device that uses an exterior metal frame as an antenna radiator.

2. Description of Related Art

An electronic device having a communication function can provide a mobile communication service using an antenna. The antenna can be arranged in a partial region of the inside and/or outside of a housing portion of the electronic device. The antenna can be formed to have a pattern of a Printed Circuit Board (PCB), or be arranged on a carrier in a plate type, or be formed in a Flexible Printed Circuit Board (FPCB) and be located within the housing portion.

For example, the antenna is located within the electronic device, and an external housing portion can be formed as a metal frame. Because a signal transmitted outside from the antenna arranged within the electronic device is at least partially distorted or blocked by the metal frame, the degradation of antenna radiation performance can be brought about.

A housing internal space of the electronic device in which the antenna will be mounted can be restricted, and can be more restricted if the electronic device is miniaturized. Also, in case where the antenna supports various frequency bands, it is required to arrange a plurality of antennas or a complicated form of antennas, so the housing internal space can be more restricted.

SUMMARY

Various example embodiments of the present disclosure can provide an electronic device that uses at least a part of an exterior metal frame as an antenna.

Various example embodiments of the present disclosure can provide an electronic device for improving antenna radiation performance by reducing degradation of antenna radiation performance in a state where the electronic device is folded.

Various example embodiments of the present disclosure can provide an electronic device for reducing the degradation of antenna radiation performance caused by a coupling part (e.g., hinge) that couples a first housing portion of the electronic device and a second housing portion thereof.

According to an example embodiment, an electronic device can include a housing including a first housing portion including a first surface, a second surface opposite to the first surface, and a first side surface at least partially surrounding a space between the first surface and the second surface, and a second housing portion including a first surface that is capable of being oriented to face the first surface of the first housing portion, a second surface facing a direction opposite to the first surface, and a second side surface at least partially surrounding a space between the first surface and the second surface, a coupling part coupling the first housing portion and the second housing portion, a communication circuit arranged within the housing portion, a ground member arranged within the housing portion, a first conductive member extending along at least a part of the first side surface, the first conductive member including at least one first gap that electrically isolates portions of the first conductive member, and a second conductive member extending along at least a part of the second side surface, the second conductive member including at least one second gap that electrically isolates portions of the second conductive member. At least one of the first housing portion or the second housing portion can include a region where the coupling part is combined between a first corner part and a second corner part. The first conductive member can include one or more first points electrically coupled to the communication circuit, and one or more second points electrically coupled to the ground member. The one or more first points or the one or more second points may be not located in the region where the coupling part is combined. One of the one or more second points can abut on the region where the coupling part is combined.

BRIEF DESCRIPTION OF THE DRAWINGS

The above and other aspects, features and attendant advantages of the present disclosure will become more apparent and readily appreciated from the following detailed description, taken in conjunction with the accompanying drawings, in which like reference numerals refer to like elements, and wherein.

DETAILED DESCRIPTION

Figure 1:
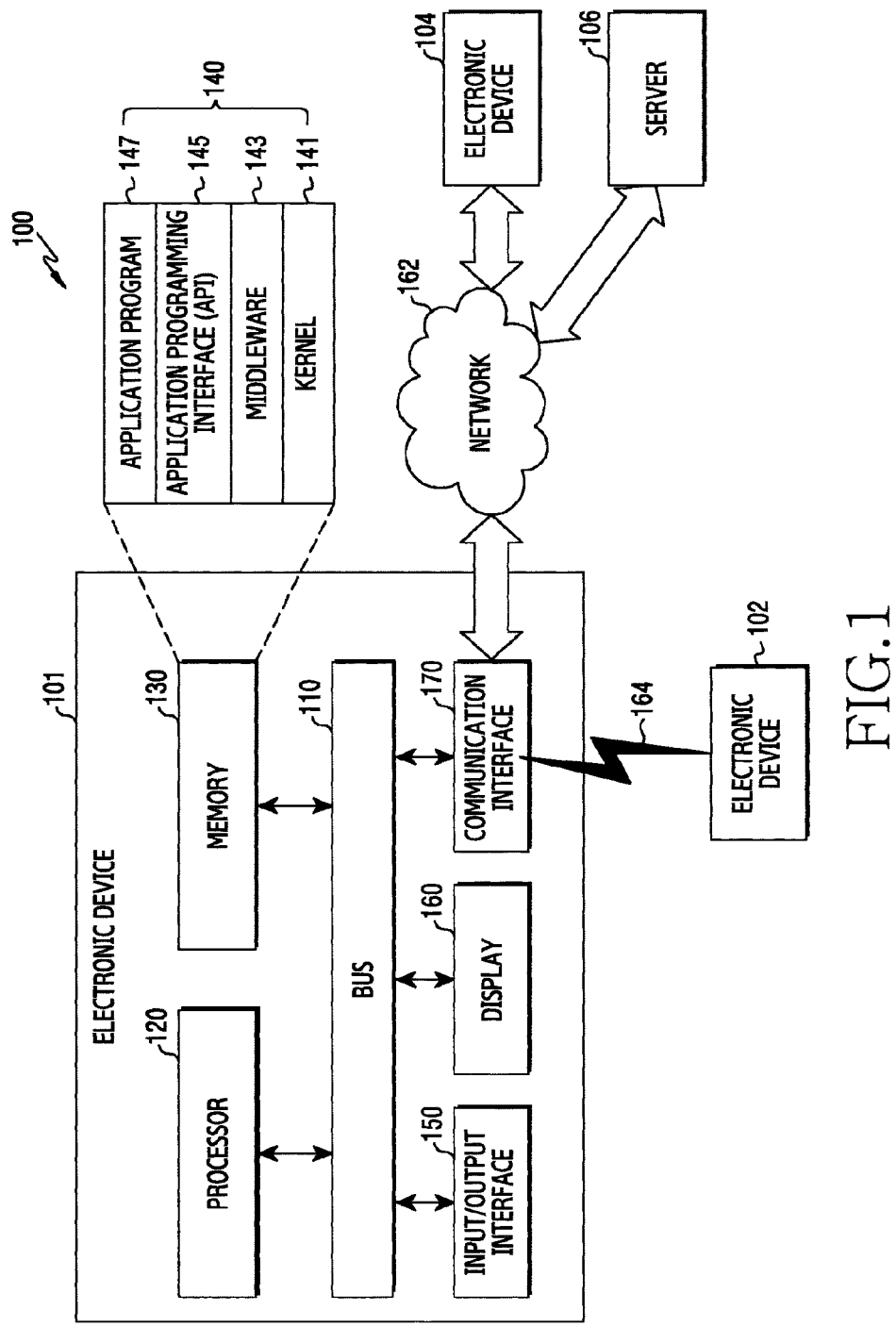
FIG. 1 is a diagram illustrating an example electronic device within a network environment according to various example embodiments.

Various example embodiments of the present disclosure are mentioned below with reference to the accompanying drawings. However, these do not intend to limit the technologies mentioned in the present disclosure to a specific embodiment form, and should be understood to include various modifications, equivalents and/or alternatives of an example embodiment of the present disclosure. In the drawings, like reference symbols denote like constituent elements.

In the present disclosure, the expressions "have", "can have", "comprise", "can comprise", etc. indicate the existence of a corresponding feature (e.g., a numeral value, a function, an operation, or a constituent element such as a component, etc.), and do not exclude the existence of an additional feature.

In the present disclosure, the expressions "A or B", "at least one of A or/and B", "one or more of A or/and B", etc. can include all available combinations of items enumerated together. For example, "A or B", "at least one of A and B", or "at least one of A or B" can denote all of the cases of (1) including at least one A, (2) including at least one B, or (3) including all of at least one A and at least one B.

The expressions "1st", "2nd", "first", "second", etc. used in the present disclosure can modify various constituent elements irrespective of order and/or importance. And, the expressions "first", "second", "first", "second", etc. are just used to distinguish one constituent element from another constituent element and do not limit the corresponding constituent elements. For example, a first user device and a second user device can represent mutually different user devices, regardless of order or importance. For example, a first constituent element can be named a second constituent element without departing from the scope of right mentioned in the present disclosure. Likely, even a second constituent element can be named interchangeably with a first constituent element.

When it is mentioned that an element (e.g., first element) is "(operatively or communicatively) coupled with/to" or "connected to" another constituent element (e.g., second element), it will have to be understood that the element can be directly coupled to the another element, or be coupled to the another element through a further element (e.g., 3rd element). On the other hand, when it is mentioned that an element (e.g., first element) is "directly coupled" or is "directly connected" to another element (e.g., second element), it can be understood that a further element (e.g., 3rd element) does not exist between the element and the another element.

In accordance to context, the expression "configured (or set) to~" used in the present disclosure can be used interchangeably with, for example, "suitable for~", "having the capacity to~", "designed to~", "adapted to~", "made to~", or "capable of~". The term "configured (or set) to~" may not necessarily mean only "specifically designed to" in hardware. Instead, in some context, the expression "device configured to~" can indicate that the device is "capable of~" together with other devices or components. For example, the phrase "processor configured (or set) to perform A, B and C" can refer to a dedicated or exclusive processor (e.g., embedded processor) for performing a corresponding operation, or a generic-purpose processor (e.g., Central Processing Unit (CPU) or Application Processor (AP)) capable of performing corresponding operations by executing one or more software programs stored in a memory device.

The terms used in the present disclosure are used to just describe specific example embodiments, and may not intend to limit the scope of another example embodiment. The expression of the singular form can include the expression of the plural form unless otherwise dictating clearly in context. The terms used herein including the technological or scientific terms can have the same meanings as those commonly understood by a person having ordinary skill in the art mentioned in the present disclosure. Among the terms used in the present disclosure, the terms defined in a general dictionary can be interpreted to have the same or similar meanings as the contextual meanings of a related technology, and are not interpreted to have ideal or excessively formal meanings unless defined clearly in the present disclosure. According to cases, even the terms defined in the present disclosure cannot be interpreted to exclude example embodiments of the present disclosure.

An electronic device according to various example embodiments of the present disclosure can, for example, include at least one of a smartphone, a tablet Personal Computer (PC), a mobile phone, a video phone, an electronic book (e-book) reader, a desktop PC, a laptop PC, a netbook computer, a workstation, a server, a Personal Digital Assistant (PDA), a Portable Multimedia Player (PMP), a Moving Picture Experts Group (MPEG-1 or MPEG-2) Audio Layer 3 (MP3) player, a mobile medical device, a camera, or a wearable device, or the like, but is not limited thereto. According to various example embodiments, the wearable device can include at least one of an accessory type (e.g., a watch, a ring, a wristlet, an anklet, a necklace, glasses, a contact lens, or a Head-Mounted-Device (HMD)), a fabric or clothing integrated type (e.g., electronic clothes), a body mounting type (e.g., a skin pad or tattoo), or a bio-implanting type (e.g., an implantable circuit), or the like, but is not limited thereto.

In some example embodiments, the electronic device can be a home appliance. The home appliance can, for example, include at least one of a television (TV), a Digital Video Disk (DVD) player, an audio system, a refrigerator, an air conditioner, a cleaner, an oven, a microwave, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic locking system, a camcorder, or an electronic frame, or the like, but is not limited thereto.

In another example embodiment, the electronic device can include at least one of various medical devices (e.g., various portable medical measurement devices (e.g., a blood glucose sensor, a heat rate sensor, a blood pressure monitor, a body temperature meter, etc.), Magnetic Resonance Angiography (MRA), Magnetic Resonance Imaging (MRI), Computed Tomography (CT), a photographing machine, an ultrasonic machine, etc.), a navigation device, a Global Navigation Satellite System (GNSS), an Event Data Recorder (EDR), a Flight Data Recorder (FDR), a car infotainment device, an electronic equipment for ship (e.g., a navigation device for ship, a gyrocompass, etc.), avionics, a security device, a head unit for car, an industrial or home robot, an Automatic Teller's Machine (ATM) of a financial institution, a Point Of Sales (POS) of a shop, or an Internet of Things (IoT) device (e.g., an electric bulb, various sensors, an electricity or gas meter, a sprinkler device, a fire alarm, a thermostat, a streetlight, a toaster, an exerciser, a hot water tank, a heater, a boiler, etc.), or the like, but is not limited thereto.

According to some example embodiments, the electronic device can include at least one of a part of furniture or building/structure, an electronic board, an electronic signature receiving device, a projector, or various metering devices (e.g., tap water, electricity, gas, and radio wave metering devices, etc.), or the like, but is not limited thereto. In various example embodiments, the electronic device can be one of the aforementioned various devices or a combination of more of them. The electronic device according to some example embodiment can be a flexible electronic device. Also, the electronic device according to an example embodiment of the present disclosure is not limited to the aforementioned devices, and can include a new electronic device according to technology growth.

An electronic device according to various example embodiments is described below with reference to the accompanying drawings. In the present disclosure, the term 'user' can denote a person who uses the electronic device or a device (e.g., artificial-intelligent electronic device) which uses the electronic device.

Referring to FIG. 1, an electronic device 101 within a network environment 100 in various example embodiments is illustrated. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. In some example embodiments, the electronic device 101 can omit at least one of the elements or additionally include another element.

The bus 110 can, for example, include a circuit coupling the elements 110 to 170 with one another and forwarding communication (e.g., a control message and/or data) between the elements.

The processor 1can include various processing circuitry, such as, for example, and without limitation, one or more of a dedicated processor, a Central Processing Unit (CPU), an Application Processor (AP), or a Communication Processor (CP). The processor 120 can, for example, execute operation or data processing for control and/or communication of at least one other element of the electronic device 101.

The memory 130 can include a volatile and/or non-volatile memory. The memory 130 can, for example, store a command or data related to at least one element of the electronic device 101. According to an example embodiment, the memory 130 can store a software and/or program 140. The program 140 can, for example, include a kernel 141, a middleware 143, an Application Programming Interface (API) 145, an application program (or "application") 147, etc. At least some of the kernel 141, the middleware 143, or the API 145 can be called an Operating System (OS).

The kernel 141 can control or manage system resources (e.g., the bus 110, the processor 120, the memory 130, etc.) that are used for executing operations or functions implemented in the other programs (e.g., the middleware 143, the API 145, or the application program 147). Also, the kernel 141 can provide an interface through which the middleware 143, the API 145, or the application program 147 can control or manage the system resources by gaining access to the individual element of the electronic device 101.

The middleware 143 can, for example, perform a relay role of enabling the API 145 or the application program 147 to communicate and exchange data with the kernel 141.

Also, the middleware 143 can process one or more work requests received from the application program 147 in accordance with priority order. For example, the middleware 143 can grant at least one of the application programs 147 the priority order capable of using the system resources (e.g., the bus 110, the processor 120, the memory 130, etc.) of the electronic device 101. For instance, by processing the one or more work requests in accordance with the priority order granted to the at least one of the application programs 147, the middleware 143 can perform scheduling, load balancing, etc. for the one or more work requests.

The API 145 is, for example, an interface for enabling the application 147 to control a function of the kernel 141 or the middleware 143. The API 145 can, for example, include at least one interface or function (e.g., an instruction) for file control, window control, image processing, text control, etc.

The input/output interface 150 may include various input/output circuitry and can, for example, play a role of an interface that is capable of forwarding a command or data inputted from a user or another external device, to element(s) of the electronic device 101. Also, the input/output interface 150 can output a command or data received from the another element(s) of the electronic device 101, to the user or another external device.

The display 160 can, for example, include a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display 160 can, for example, display various contents (e.g., a text, an image, a video, an icon, a symbol, etc.) to a user. The display 160 can include a touch screen. For example, the display 160 can receive a touch, gesture, proximity, or hovering input that uses an electronic pen or a part of the user's body.

The communication interface 170 may include various communication circuitry and can, for example, establish communication between the electronic device 101 and an external device (e.g., the first external electronic device 102, the second external electronic device 104, or the server 106). For example, the communication interface 170 can be coupled to a network 162 through wireless communication or wired communication, and communicate with the external device (e.g., the second external electronic device 104 or the server 106).

The wireless communication, for example, a cellular communication protocol, can, for example, use at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc. Also, the wireless communication can, for example, include short-range communication 164. The short-range communication 164 can, for example, include at least one of Wireless Fidelity (WiFi), Bluetooth (BT), Near Field Communication (NFC), Global Navigation Satellite System (GNSS), etc. In accordance with a use area, a bandwidth, etc., the GNSS can, for example, include at least one of a Global Positioning System (GPS), a Global navigation satellite system (Glonass), a Beidou navigation satellite system (hereinafter, "Beidou"), Galileo, or the European global satellite-based navigation system. Below, in the present disclosure, the "GPS" can be used interchangeably with the "GNSS". The wired communication can, for example, include at least one of a Universal Serial Bus (USB), a High Definition Multimedia Interface (HDMI), Recommended Standard-232 (RS-232), Plain Old Telephone Service (POTS), etc. The network 162 can include at least one of a telecommunications network, for example, a computer network (e.g., a LAN or a WAN), the Internet, or a telephone network.

According to an example embodiment, the electronic device 101 can be a foldable electronic device. For example, the electronic device 101 can include a first housing portion (not shown) that includes a first surface, a second surface looking opposite to the first surface, and a first side surface at least partially surrounding a space between the first surface and the second surface. The electronic device 101 can include a second housing portion (not shown) that includes a first surface that is capable of being oriented to face the first surface of the first housing portion, a second surface looking opposite to the first surface, and a second side surface at least partially surrounding a space between the first surface and the second surface. The electronic device 101 can include a coupling part (not shown) that couples the first housing portion and the second housing portion.

The communication interface 170 can use as an antenna at least a part of the first housing portion and the second housing portion. According to an example embodiment, the communication interface 170 can include a communication circuit (not shown) and a ground member (not shown) that are arranged within at least one of the first housing portion and the second housing portion. The communication interface 170 can include a first conductive member extending along at least a part of the first side surface of the first housing portion, and the first conductive member (not shown) includes at least one first gap that electrically isolates portions of the first conductive member. The communication interface 170 can include a second conductive member extended along at least a part of the second side surface of the second housing portion, and the second conductive member (not shown) includes at least one second gap that electrically isolates portions of the second conductive member.

The communication interface 170 can include elements for reducing the degradation of antenna radiation performance in a folded state of the electronic device 101. According to an example embodiment, the communication interface 170 can include elements for reducing the degradation of antenna radiation performance caused by a coupling part (e.g., a hinge) coupling the first housing portion and the second housing portion. According to the elements for reducing the degradation of the antenna radiation performance, at least one of the first housing portion or the second housing portion can include a region where the coupling part is combined between a first corner part and a second corner part. According to the elements for reducing the degradation of the antenna radiation performance, the first conductive member can include one or more first points that are electrically coupled to the communication circuit and one or more second points that are electrically coupled to the ground member. According to the elements for reducing the degradation of the antenna radiation performance, the one or more first points or the one or more second points may not be located in the region where the coupling part is combined. According to the elements for reducing the degradation of the antenna radiation performance, one of the one or more second points can abut on the region where the coupling part is combined.

The first and second electronic devices 102 and 104 each can be a device of the same or different type from that of the electronic device 101. According to an example embodiment, the server 106 can include a group of one or more servers. According to various example embodiments, all or some of operations executed in the electronic device 101 can be executed in another one electronic device or a plurality of electronic devices (e.g., the electronic devices 102 and 104 or the server 106). According to an example embodiment, in case where the electronic device 101 has to perform some function or service automatically or in response to a request, the electronic device 101 can, instead of or additionally to executing the function or service in itself, send a request for at least a partial function associated with this to another electronic device (e.g., the electronic devices 102 and 104 or the server 106). The another electronic device (e.g., the electronic devices 102 and 104 or the server 106) can execute the requested function or additional function, and forward the execution result to the electronic device 101. The electronic device 101 can process the received result as it is or additionally, and provide the requested function or service. For this, for example, a cloud computing, distributed computing, or client-server computing technology can be used.

Figure 2:
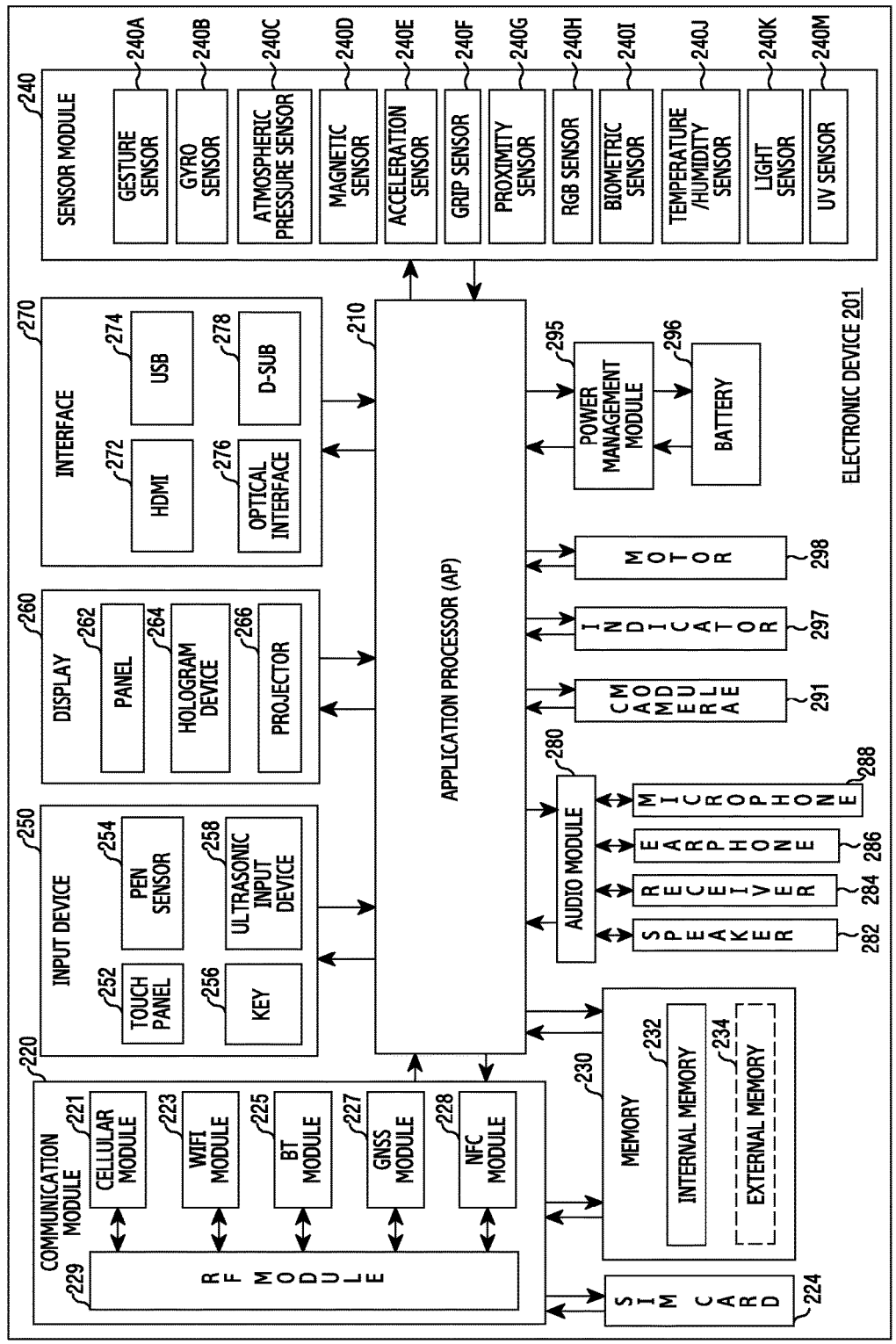
FIG. 2 is a block diagram illustrating an example electronic device according to various example embodiments.

FIG. 2 is a block diagram illustrating an example electronic device 201 according to various example embodiments. The electronic device 201 can, for example, include the entire of the electronic device 101 illustrated in FIG. 1 or a part thereof. The electronic device 201 can include one or more processors (e.g., Application Processor (AP) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and can, for example, drive an operating system or an application program to control a majority of hardware or software constituent elements coupled to the processor 210, and can perform various data processing and operations. The processor 210 can be, for example, implemented as a System On Chip (SoC). According to an example embodiment, the processor 210 can further include a Graphic Processing Unit (GPU) and/or an image signal processor. The processor 210 can include at least some (e.g., the cellular module 221) of the constituent elements illustrated in FIG. 2 as well. The processor 210 can load a command or data received from at least one of the other constituent elements (e.g., non-volatile memory), to a volatile memory and process the loaded command or data, and store various data in the non-volatile memory.

The communication module 220 may include various communication circuitry and can have the same or similar construction with the communication interface 170 of FIG. 1. The communication module 220 may include various communication circuitry, such as, for example, and without limitation, a cellular module 221, a WiFi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 can, for example, provide voice telephony, video telephony, a text service, an Internet service, etc., through a telecommunication network. According to an example embodiment, the cellular module 221 can use the subscriber identification module (e.g., SIM card) 224, to perform the distinction and authentication of the electronic device 201 within the telecommunication network. According to an example embodiment, the cellular module 221 can perform at least some functions among functions that the processor 210 can provide. According to an example embodiment, the cellular module 221 can include a Communication Processor (CP).

The WiFi module 223, the Bluetooth module 225, the GNSS module 227 or the NFC module 228 each can, for example, include a processor for processing data that is transmitted/received through the corresponding module. According to some example embodiment, at least some (e.g., two or more) of the cellular module 221, the WiFi module 223, the Bluetooth module 225, the GNSS module 227 or the NFC module 228 can be included within one Integrated Chip (IC) or IC package.

The RF module 229 can, for example, transceive a communication signal (e.g., RF signal). The RF module 229 can, for example, include a transceiver, a Power Amplifier Module (PAM), a frequency filter, a Low Noise Amplifier (LNA), an antenna, etc. According to another example embodiment, at least one of the cellular module 221, the WiFi module 223, the Bluetooth module 225, the GNSS module 227 or the NFC module 228 can transceive an RF signal through a separate RF module.

According to an example embodiment, the electronic device 201 can be a foldable electronic device. For example, the electronic device 201 can include a first housing portion (not shown) that includes a first surface, a second surface looking opposite to the first surface, and a first side surface at least partially surrounding a space between the first surface and the second surface. The electronic device 201 can include a second housing portion (not shown) that includes a first surface that is capable of being oriented to face the first surface of the first housing portion, a second surface looking opposite to the first surface, and a second side surface at least partially surrounding a space between the first surface and the second surface. The electronic device 201 can include a coupling part (not shown) that couples the first housing portion and the second housing portion.

The communication module 220 can use as an antenna at least a part of the first housing portion and the second housing portion. According to an example embodiment, the communication module 220 can include a communication circuit (not shown) and a ground member (not shown) that are arranged within at least one of the first housing portion and the second housing portion. The communication module 220 can include a first conductive member extended along at least a part of the first side surface of the first housing portion, and the first conductive member (not shown) includes at least one first gap that electrically isolates portions of the first conductive member. The communication module 220 can include a second conductive member extended along at least a part of the second side surface of the second housing portion, and the second conductive member (not shown) includes at least one second gap that electrically isolates portions of the second conductive member.

The communication module 220 can include elements for reducing the degradation of antenna radiation performance in a folded state of the electronic device 201. According to an example embodiment, the communication module 220 can include elements for reducing the degradation of antenna radiation performance caused by a coupling part (e.g., a hinge) coupling the first housing portion and the second housing portion. According to the elements for reducing the degradation of the antenna radiation performance, at least one of the first housing portion or the second housing portion can include a region where the coupling part is combined between a first corner part and a second corner part. According to the elements for reducing the degradation of the antenna radiation performance, the first conductive member can include one or more first points electrically coupled to the communication circuit and one or more second points electrically coupled to the ground member. According to the elements for reducing the degradation of the antenna radiation performance, the one or more first points or the one or more second points may not be located in the region where the coupling part is combined. According to the elements for reducing the degradation of the antenna radiation performance, one of the one or more second points can abut on the region where the coupling part is combined.

The subscriber identification module 224 can, for example, include a card and/or embedded SIM that includes a subscriber identification module, and can include unique identification information (e.g., an Integrated Circuit Card Identifier (ICCID)) or subscriber information (e.g., an International Mobile Subscriber Identity (IMSI)).

The memory 230 (e.g., the memory 130) can, for example, include an internal memory 232 and/or an external memory 234. The internal memory 232 can, for example, include at least one of a volatile memory (e.g., a Dynamic Random Access Memory (DRAM), a Static RAM (SRAM), a Synchronous Dynamic RAM (SDRAM), etc.) and/or a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., Not AND (NAND) flash, Not OR (NOR) flash, etc.), a hard drive, or a Solid State Drive (SSD)).

The external memory 234 can further include a flash drive, for example, Compact Flash (CF), Secure Digital (SD), micro-SD, mini-SD, extreme Digital (xD), a Multi Media card (MMC), a memory stick, etc. The external memory 234 can be operatively and/or physically coupled with the electronic device 201 through various interfaces.

The sensor module 240 can, for example, measure a physical quantity or sense an activation state of the electronic device 201, and convert measured or sensed information into an electrical signal. The sensor module 240 can, for example, include at least one of a gesture sensor 240A, a gyro sensor 240B, a 10 barometer (e.g., atmospheric pressure sensor) 240C, a magnetic sensor 240D, an acceleration sensor 240E, a grip sensor 240F, a proximity sensor 240G, a Red, Green, Blue (RGB) sensor (e.g., a color sensor) 240H, a medical (e.g., biometric) sensor 240I, a temperature-humidity sensor 240J, an illuminance (e.g., light) sensor 240K, or an Ultra Violet (UV) sensor 240M. Additionally or alternatively, the sensor module 240 can, for example, include an E-nose sensor, an Electromyography (EMG) sensor, an Electroencephalogram (EEG) sensor, an Electrocardiogram (ECG) sensor, an InfraRed (IR) sensor, an iris scan sensor, and/or a finger scan sensor. The sensor module 240 can further include a control circuit for controlling at least one or more sensors belonging therein. In some example embodiment, the electronic device 201 can further include a processor configured to control the sensor module 240 as a part of the processor 210 or separately, thereby controlling the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 can, for example, use at least one scheme among a capacitive overlay scheme, a pressure sensitive scheme, an infrared beam scheme, or an ultrasonic scheme. Also, the touch panel 252 can further include a control circuit as well. The touch panel 252 can further include a tactile layer, to provide a tactile response to a user.

The (digital) pen sensor 254 can, for example, be a part of a touch panel, or include a separate sheet for recognition. The key 256 can, for example, include a physical button, an optical key, or a keypad. The ultrasonic input device 258 can sense an ultrasonic wave generated in an input tool, through a microphone (e.g., a microphone 288), and check data corresponding to the sensed ultrasonic wave.

The display 260 (e.g., the display 160) can include a panel 262, a hologram device 264, or a projector 266. The panel 262 can include the same or similar construction with the display 160 of FIG. 1. The panel 262 can, for example, be implemented to be flexible, transparent or wearable. The panel 262 can be constructed as one module together with the touch panel 252 as well. The hologram device 264 can use an interference of light to show a three-dimensional image to the air. The projector 266 can project light onto a screen to display an image. The screen can, for example, be located inside or outside the electronic device 201. According to an example embodiment, the display 260 can further include a control circuit for controlling the panel 262, the hologram device 264 or the projector 266.

The interface 270 may include various interface circuitry, such as, for example, and without limitation, an HDMI 272, a USB 274, an optical interface 276, or a D-subminiature (D-sub) 278. The interface 270 can be, for example, included in the communication interface 170 illustrated in FIG. 1. Additionally or alternatively, the interface 270 can, for example, include a Mobile High-definition Link (MHL) interface, an SD card/Multi Media Card (MMC) interface, or an Infrared Data Association (IrDA) standard interface.

The audio module 280 can, for example, convert a sound and an electric signal interactively. At least some constituent elements of the audio module 280 can be, for example, included in the input output interface 150 illustrated in FIG. 1. The audio module 280 can, for example, process sound information that is inputted or outputted through a speaker 282, a receiver 284, an earphone 286, the microphone 288, etc.

The camera module 291 is, for example, a device able to take a still picture and a moving picture. According to an example embodiment, the camera module 291 can include one or more image sensors (e.g., a front sensor or a rear sensor), a lens, an Image Signal Processor (ISP), or a flash (e.g., a Light Emitting Diode (LED), a xenon lamp, etc.).

The power management module 295 can, for example, manage electric power of the electronic device 201. According to an example embodiment, the power management module 295 can include a Power Management Integrated Circuit (PMIC), a charger Integrated Circuit (IC), or a battery or fuel gauge. The PMIC can, for example, have a wired and/or wireless charging scheme. The wireless charging scheme can, for example, include a magnetic resonance scheme, a magnetic induction scheme, an electromagnetic wave scheme, etc., and further include a supplementary circuit for wireless charging, for example, a coil loop, a resonance circuit, a rectifier, etc. The battery gauge can, for example, measure a level of the battery 296, a voltage during charge, an electric current or a temperature. The battery 296 can, for example, include a rechargeable battery and/or a solar battery.

The indicator 297 can display a specific state of the electronic device 201 or a part (e.g., the processor 210) thereof, for example a booting state, a message state, a charging state, etc. The motor 298 can convert an electric signal into a mechanical vibration, and can generate a vibration, a haptic effect, etc. Though not illustrated, the electronic device 201 can include a processing device (e.g., a GPU) for mobile TV support. The processing device for mobile TV support can, for example, process media data according to the standards of Digital Multimedia Broadcasting (DMB), Digital Video Broadcasting (DVB), Media-Flo™, etc.

Each of the elements described in the present disclosure can include one or more components, and a name of the corresponding constituent element can become different according to the kind of an electronic device. In various example embodiments, the electronic device can include at least one of the elements described in the present disclosure, and can omit some elements or further include additional elements. Also, some of the elements of the electronic device according to various example embodiments are combined and constructed as one entity, thereby being capable of identically performing the functions of the corresponding constituent elements before combination.

FIGS. 3A, 3B, 3C, 3D and 3E are diagrams illustrating an example foldable electronic device according to an example embodiment of the present disclosure. According to various example embodiments, the foldable electronic device 300 can include at least some of elements of the electronic device 101 of FIG. 1 or the electronic device 201 of FIG. 2.

Figure 3A:
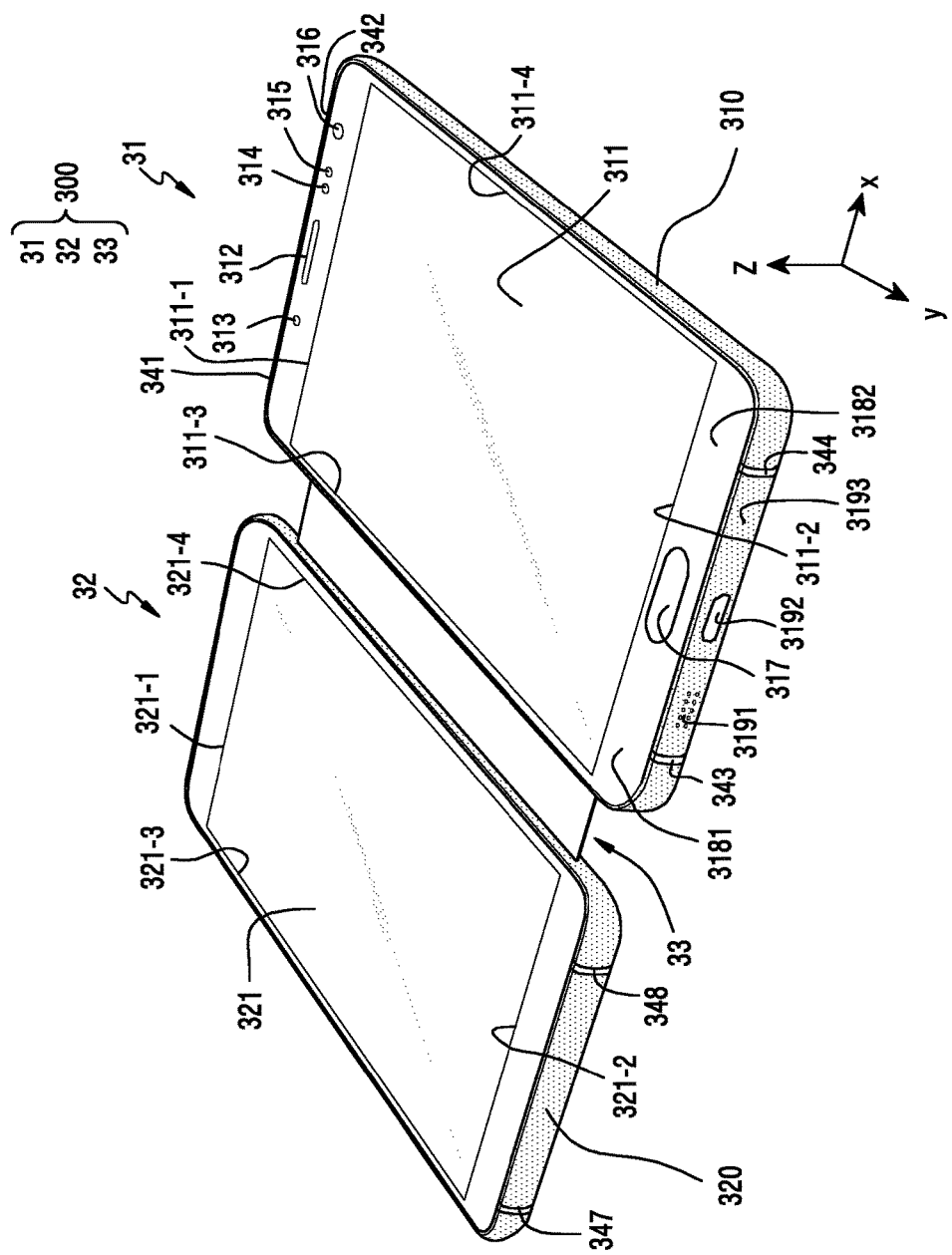
FIGS. 3A, 3B, 3C, 3D and 3E are diagrams illustrating an example foldable electronic device according to an example embodiment of the present disclosure.
Figure 3B:
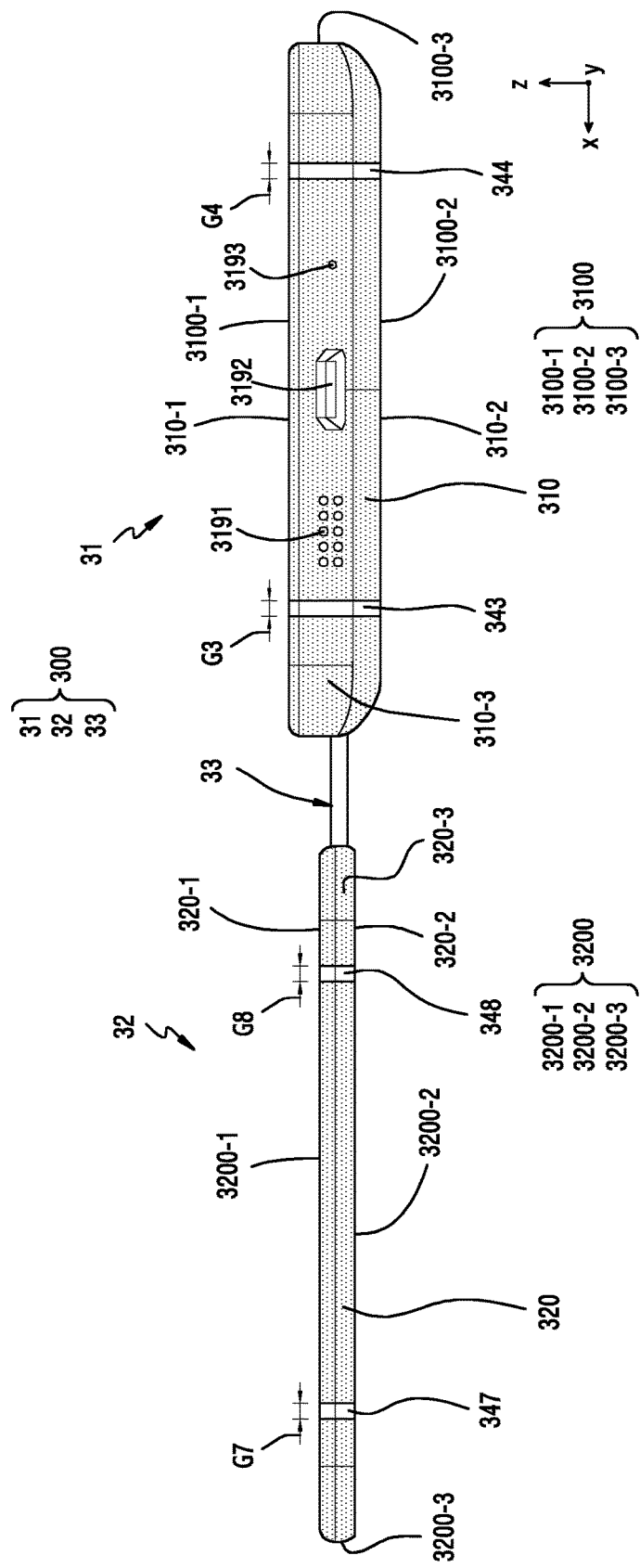
Figure 3C:
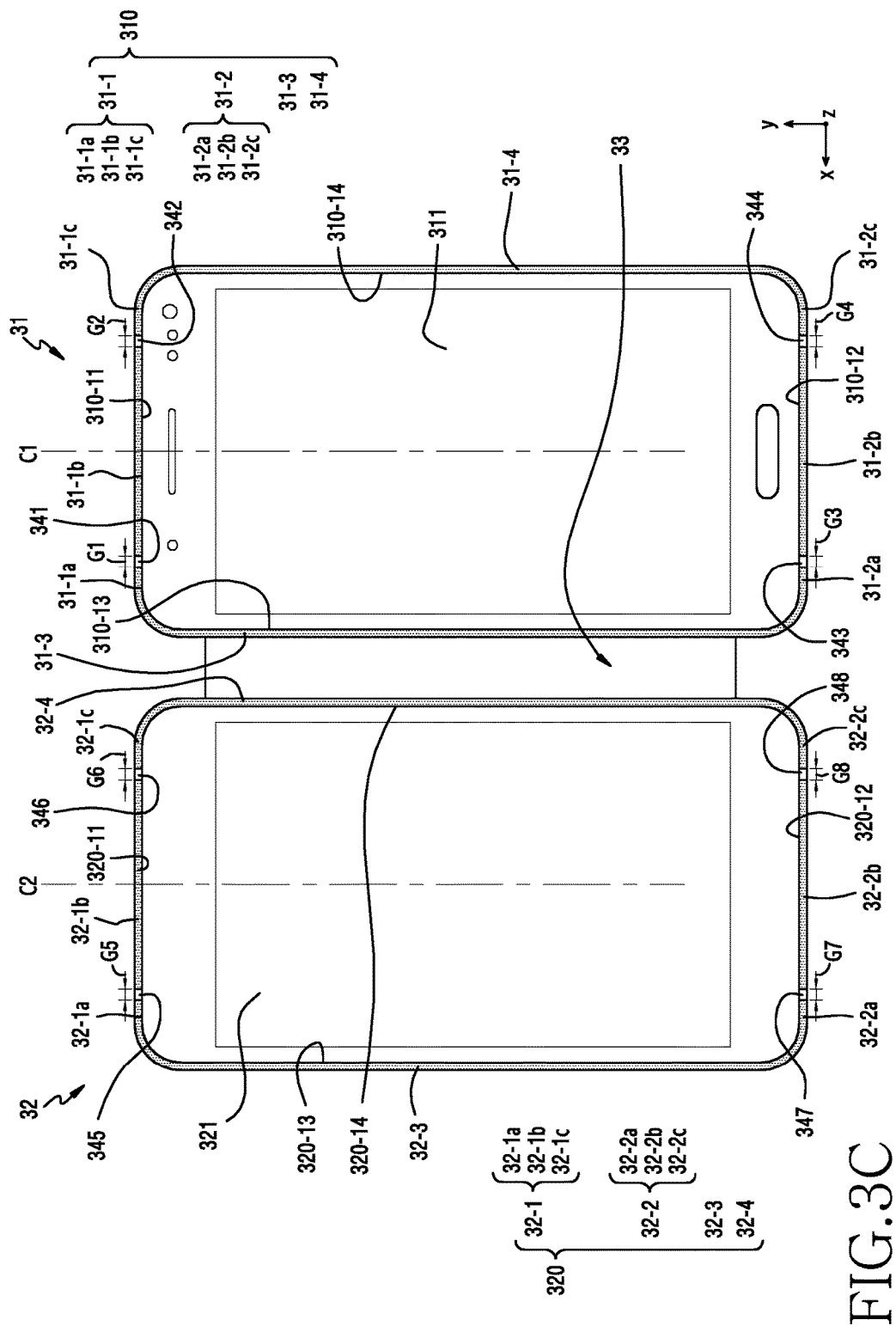

Referring to FIG. 3A, 3B and FIG. 3C, the foldable electronic device 300 can include a first electronic device 31, a second electronic device 32 and a hinge (or coupling part or joint) 33. The hinge 33 can couple the first electronic device 31 and the second electronic device 32. The second electronic device 32 can use the hinge 33 to rotate with respect to the first electronic device 31.

According to an example embodiment, the hinge (e.g., joint) 33 can be flexible, and can support the folding of the electronic device 300.

The hinge 33 can electrically couple the first electronic device 31 and the second electronic device 32. For example, the first electronic device 31 and the second electronic device 32 can exchange an electrical signal through the hinge 33.

According to an example embodiment, the hinge 33 can include a Flexible Printed Circuit Board (FPCB).

According to an example embodiment, the electronic device 300 can include a first housing portion 3100 that forms the entire or at least one portion of an exterior of the first electronic device 31. According to various example embodiments, the first housing portion 3100 can include nonmetallic materials and/or metallic materials. For example, the first housing portion 3100 can be formed of materials such as a plastic, a metal, a carbon fiber, other fiber composites, a ceramic, a glass, and a timber or a combination of these materials. Or, the first housing portion 3100 can be entirely formed of one material or a combination of a majority of materials. Or, the first housing portion 3100 can be partially formed of materials whose physical properties are different as well.

According to an example embodiment, the first housing portion 3100 can form a 1-1 surface 3100-1, a 1-2 surface 3100-2 and a 1-3 surface 3100-3. The 1-1 surface 3100-1 and 1-2 surface 3100-2 of the first housing portion 3100 can look to mutually different directions. The 1-3 surface 3100-3 can surround at least a part of a space between the 1-1 surface 3100-1 and the 1-2 surface 3100-2.

According to an example embodiment, the 1-1 surface 3100-1 and/or 1-2 surface 3100-2 of the first housing portion 3100 can be substantially a plane. The 1-3 surface 3100-3 of the first housing portion 3100 can include a plane or a curved surface.

According to an example embodiment, the first housing portion 3100 can include a 1-1 cover 310-1 forming the 1-1 surface 3100-1 and/or a 1-2 cover 310-2 forming the 1-2 surface 3100-2. The first housing portion 3100 can include a first bezel 310 that surrounds a space between the 1-1 cover 310-1 and the 1-2 cover 310-2 and forms the 1-3 surface (or first side surface) 3100-3.

According to an example embodiment, the first electronic device 31 can include a first display 311 that is built in a space provided by the 1-1 cover 310-1 and 1-2 cover 310-2 of the first housing portion 3100. A screen region of the first display 311 can be exposed to the external through the 1-1 cover 310-1. According to various example embodiments, the first display 311 can further include a touch sensing device for a touch input and/or a hovering input. For example, in case where a finger or a stylus comes in contact with the 1-1 surface 3100-1, the first electronic device 31 can sense a touch input through the first display 311. Or, in case where the finger or the stylus is isolated adjacently from the 1-1 surface 3100-1, the first electronic device 31 can sense a hovering input using the first display 311.

According to various example embodiments, the first display 311 can include a conductive pattern for a touch input or a hovering input. For example, the conductive pattern can be arranged within the first display 311. According to an example embodiment, the conductive pattern can be arranged in an in-cell region of the first display 311. According to another example embodiment, the conductive pattern can be arranged in an on-cell region of the first display 311. Or, the conductive pattern can at least partially include aluminum (Al), copper (Cu), argentum (Ag), graphene, Indium-Tin-Oxide (ITO) or Indium-Zinc-Oxide (IZO).

According to various example embodiments, the first display 311 can be a touch screen integrated display. For instance, the first display 311 can include an AMOLED integrated touch screen (e.g., On-Cell TSP AMOLED (OCTA)).

According to an example embodiment, a screen region of the first display 311 can be a rectangular form that includes a first short side 311-1, a second short side 311-2, a first long side 311-3 and a second long side 311-4.

According to an example embodiment, the 1-1 cover 310-1 can be a rectangular form that includes a first edge 310-11 abutting on the first short side 311-1 of the screen region, a second edge 310-12 abutting on the second short side 311-2 of the screen region, a 3rd edge 310-13 abutting on the 3rd long side 311-3 of the screen region, and a 4th edge 310-14 abutting on the 4th long side 311-4 of the screen region. The 3rd edge 310-13 can couple one end of the first edge 310-11 and one end of the second edge 310-12. The 4th edge 310-14 can couple the other end of the first edge 310-11 and the other end of the second edge 310-12. A coupling portion between the first edge 310-11 and the 3rd edge 310-13 can be a curve form. A coupling portion between the first edge 310-11 and the 4th edge 310-14 can be a curve form. A coupling portion between the second edge 310-12 and the 3rd edge 310-13 can be a curve form. Or, a coupling portion between the second edge 310-12 and the 4th edge 310-14 can be a curve form.

According to an example embodiment, when viewing in the direction going from the 1-1 cover 310-1 to the 1-2 cover 310-2, the 1-2 cover 310-2 can be an approximately rectangular form corresponding to the 1-1 cover 310-1.

According to various example embodiments, the first electronic device 31 can include various components that are arranged between the first edge 310-11 of the 1-1 cover 310-1 and the first short side 311-1 of the screen region. For example, the component can include a receiver 312 for outputting, by a sound, a voice signal received from a counterpart device during a call. For example, the component can include at least one sensor 313, 314 or 315. The at least one sensor can include an optical sensor (e.g., illuminance sensor), a proximity sensor, an infrared sensor, an ultrasonic sensor, etc. For example, the component can include a camera 316 including an image sensor.

According to various example embodiments, the first electronic device 31 can include various components that are arranged between the second edge 310-12 of the 1-1 cover 310-1 and the second short side 311-2 of the screen region. For example, the component can be input keys of various forms. The input key can be a button (e.g., home button) 317 of a press scheme. According to various example embodiments, the input key can be a touch key 3181 or 3182 of a touch scheme.

According to an example embodiment, the 1-1 cover 310-1 and/or the 1-2 cover 310-2 can be formed of light transmission materials (e.g., glass).

According to an example embodiment, the first bezel 310 can include a 1-1 metal frame 31-1 abutting on the first edge 310-11 of the 1-1 cover 310-1, a 1-2 metal frame 31-2 abutting on the second edge 310-12 of the 1-1 cover 310-1, a 1-3 metal frame 31-3 abutting on the 3rd edge 310-13 of the 1-1 cover 310-1, and a 1-4 metal frame 31-4 abutting on the 4th edge 310-14 of the 1-1 cover 310-1. The 1-1 metal frame 31-1 and the 1-2 metal frame 31-2 can be arranged at mutually opposite sides, and the 1-3 metal frame 31-3 and the 1-4 metal frame 31-4 can be arranged at mutually opposite sides. The 1-1 metal frame 31-1 can couple one end of the 1-3 metal frame 31-3 and one end of the 1-4 metal frame 31-4. The 1-2 metal frame 31-2 can couple the other end of the 1-3 metal frame 31-3 and the other end of the 1-4 metal frame 31-4. A combination of the 1-1 metal frame 31-1, the 1-2 metal frame 31-2, the 1-3 metal frame 31-3 and the 1-4 metal frame 31-4 can be a ring shape of an approximately rectangular form. The 1-3 surface 3100-3 of the first housing portion 3100 formed by the first bezel 310 can have an approximately rectangular ring form.

According to various example embodiments, a coupling portion between the 1-1 metal frame 31-1 of the first bezel 310 and the 1-3 metal frame 31-3 thereof can have a curve form. A coupling portion between the 1-1 metal frame 31-1 of the first bezel 310 and the 1-4 metal frame 31-4 thereof can have a curve form. A coupling portion between the 1-2 metal frame 31-2 of the first bezel 310 and the 1-3 metal frame 31-3 thereof can have a curve form. According to various example embodiments, a coupling portion between the 1-2 metal frame 31-2 of the first bezel 310 and the 1-4 metal frame 31-4 thereof can have a curve form.

According to various example embodiments, though not illustrated, the first bezel 310 can include an extension portion (not shown) that is extended towards the inside of the first housing portion 3100 from at least one of the 1-1 metal frame 31-1, the 1-2 metal frame 31-2, the 1-3 metal frame 31-3 and the 1-4 metal frame 31-4. The extension portion can be combined with a Printed Circuit Board (PCB), a bracket, etc.

According to an example embodiment, at least one of the 1-1 metal frame 31-1, the 1-2 metal frame 31-2, the 1-3 metal frame 31-3 and the 1-4 metal frame 31-4 of the first bezel 310 can include a majority of metal portions (or conductive portions) that are mutually physically isolated. A nonconductive member can be arranged between the majority of metal portions. The nonconductive member can form a part of the 1-3 surface 3100-3 of the first housing portion 3100. Or, the nonconductive member can be a member that is extended from a nonconductive portion arranged within the first housing portion 3100.

According to an example embodiment, the 1-1 metal frame 31-1 of the first bezel 310 can include a 1-1a metal frame 31-1a, a 1-1b metal frame 31-1b and a 1-1c metal frame 31-1c that are isolated mutually physically. The 1-1b metal frame 31-1b can be arranged between the 1-1a metal frame 31-1a and the 1-1c metal frame 31-1c.

According to an example embodiment, the 1-1a metal frame 31-1a of the 1-1 metal frame 31-1 can be coupled to the 1-3 metal frame 31-3. The 1-1c metal frame 31-1c of the 1-1 metal frame 31-1 can be coupled to the 1-4 metal frame 31-4. The 1-1a metal frame 31-1a and the 1-3 metal frame 31-3 can be formed of one-piece metal. According to various example embodiments, the 1-1c metal frame 31-1c and the 1-4 metal frame 31-4 can be formed of one-piece metal.

According to an example embodiment, the first electronic device 31 can include a first nonconductive member 341 that is arranged between the 1-1a metal frame 31-1a of the first bezel 310 and the 1-1b metal frame 31-1b thereof. The first electronic device 31 can include a second nonconductive member 342 that is arranged between the 1-1b metal frame 31-1b and the 1-1c metal frame 31-1c. The first nonconductive member 341 and the second nonconductive member 342 can be smoothly coupled with the 1-1 metal frame 31-1, and form a part of the 1-3 surface 3100-3 of the first housing portion 3100. The first nonconductive member 341 and/or the second nonconductive member 342 can be a portion extended from a nonconductive member that is arranged within the first housing portion 3100.

According to an example embodiment, the first electronic device 31 can be a shape of being approximately symmetrical at both sides of a center line (C1) heading from the 1-1 metal frame 31-1 to the 1-2 metal frame 31-2. The center line (C1) exists between the first nonconductive member 341 and the second nonconductive member 342, and the first nonconductive member 341 and the second nonconductive member 342 can be arranged at the same distance from the center line (C1). According to various example embodiments, the first nonconductive member 341 and the second nonconductive member 342 may not be arranged at the same distance from the center line (C1).

According to an example embodiment, a first gap (G1) between the 1-1a metal frame 31-1a and the 1-1b metal frame 31-1b can be a portion filled with the first nonconductive member 341. A second gap (G2) between the 1-1b metal frame 31-1b and the 1-1c metal frame 31-1c can be a portion filled with the second nonconductive member 342. Widths of the first gap (G1) and the second gap (G2) can be the same as or be different from each other.

According to an example embodiment, the 1-2 metal frame 31-2 of the first bezel 310 can include a 1-2a metal frame 31-2a, a 1-2b metal frame 31-2b and a 1-2c metal frame 31-2c that are isolated mutually physically. The 1-2b metal frame 31-2b can be arranged between the 1-2a metal frame 31-2a and the 1-2c metal frame 31-2c.

According to an example embodiment, the 1-2a metal frame 31-2a of the 1-2 metal frame 31-2 can be coupled to the 1-3 metal frame 31-3. The 1-2c metal frame 31-2c of the 1-2 metal frame 31-2 can be coupled to the 1-4 metal frame 31-4. The 1-2a metal frame 31-2a and the 1-3 metal frame 31-3 can be formed of one-piece metal. According to various example embodiments, the 1-2c metal frame 31-2c and the 1-4 metal frame 31-4 can be formed of one-piece metal.

According to various example embodiments, a combination of the 1-1a metal frame 31-1a, the 1-3 metal frame 31-3 and the 1-2a metal frame 31-2a can be an approximately 'U' shape. According to various example embodiments, a combination of the 1-1c metal frame 31-1c, the 1-4 metal frame 31-4 and the 1-2c metal frame 31-2c can be an approximately 'U' shape.

According to an example embodiment, the first electronic device 31 can include a 3rd nonconductive member 343 that is arranged between the 1-2a metal frame 31-2a of the first bezel 310 and the 1-2b metal frame 31-2b thereof. The first electronic device 31 can include a 4th nonconductive member 344 that is arranged between the 1-2b metal frame 31-2b and the 1-2c metal frame 31-2c. The 3rd nonconductive member 343 and the 4th nonconductive member 344 can be smoothly coupled with the 1-2 metal frame 31-2, and form a part of the 1-3 surface 3100-3 of the first housing portion 3100. The 3rd nonconductive member 343 and/or the 4th nonconductive member 344 can be a portion extended from a nonconductive member that is arranged within the first housing portion 3100.

According to an example embodiment, the center line (C1) exists between the 3rd nonconductive member 343 and the 4th nonconductive member 344, and the 3rd nonconductive member 343 and the 4th nonconductive member 344 can be arranged at the same distance from the center line (C1). Or, the 3rd nonconductive member 343 and the 4th nonconductive member 344 may not be arranged at the same distance from the center line (C1).

According to an example embodiment, a 3rd gap (G3) between the 1-2a metal frame 31-2a and the 1-2b metal frame 31-2b can be a portion filled with the 3rd nonconductive member 343. A 4th gap (G4) between the 1-2b metal frame 31-2b and the 1-2c metal frame 31-2c can be a portion filled with the 4th nonconductive member 344. Widths of the 3rd gap (G3) and the 4th gap (G4) can be the same as or be different from each other.

According to an example embodiment, the first nonconductive member 341 and the 3rd nonconductive member 343 may be either arranged at the same distance from the center line (C1), or not be arranged at the same distance.

According to an example embodiment, the second nonconductive member 342 and the 4th nonconductive member 343 may be either arranged at the same distance from the center line (C1), or not be arranged at the same distance.

According to an example embodiment, the first bezel 310 can be constructed as at least a part of a wireless communication device. Through electrical coupling between the 1-1 metal frame 31-1, the 1-2 metal frame 31-2, the 1-3 metal frame 31-3 and the 1-4 metal frame 31-4, the first bezel 310 can be used as at least a part of the wireless communication device of the electronic device 300 capable of transmitting/receiving a wireless signal. For example, at least a part of the first bezel 310 can be formed in a 'first state' of being electrically coupled to a communication circuit (not shown) of the electronic device 300, to play a role of an antenna radiator. Or, the at least part of the first bezel 310 can be formed in a 'second state' of being electrically coupled to a ground member (not shown) (e.g., the ground of a PCB) of the electronic device 300, to play a role of an antenna ground. Or, the at least part of the first bezel 310 can be formed in a '3rd state' that is an electrical floating state as well.

According to various example embodiments, at least one portion of the 1-1b metal frame 31-1b of the 1-1 metal frame 31-1 can be formed in at least one of the 'first state' and the 'second state', or be formed in the '3rd state'. At least one portion of the 1-2b metal frame 31-2b of the 1-2 metal frame 31-2 can be formed in at least one of the 'first state' and the 'second state', or be formed in the ' 3rd state'. At least one portion of a metal frame including the 1-1a metal frame 31-1a of the 1-1 metal frame 31-1, the 1-3 metal frame 31-3 and the 1-2a metal frame 31-2a of the 1-2 metal frame 31-2 can be formed in at least one of the 'first state' and the 'second state', or be formed in the '3rd state'. Or, at least one portion of a metal frame including the 1-1c metal frame 31-1c of the 1-1 metal frame 31-1, the 1-4 metal frame 31-4 and the 1-2c metal frame 31-2c of the 1-2 metal frame 31-2 can be formed in at least one of the 'first state' and the 'second state', or be formed in the '3rd state'.

According to various example embodiments, the 1-1b metal frame 31-1b of the 1-1 metal frame 31-1 can be electrically coupled to a communication circuit of the electronic device 300 in at least one location. According to various example embodiments, the 1-2b metal frame 31-2b of the 1-2 metal frame 31-2 can be electrically coupled to the communication circuit of the electronic device 300 in at least one location. According to various example embodiments, a metal frame including the 1-1a metal frame 31-1a of the 1-1 metal frame 31-1, the 1-3 metal frame 31-3 and the 1-2a metal frame 31-2a of the 1-2 metal frame 31-2 can be electrically coupled to the communication circuit of the electronic device 300 in at least one location. Or, a metal frame including the 1-1c metal frame 31-1c of the 1-1 metal frame 31-1, the 1-4 metal frame 31-4 and the 1-2c metal frame 31-2c of the 1-2 metal frame 31-2 can be electrically coupled to the communication circuit of the electronic device 300 in at least one location.

According to various example embodiments, the 1-1b metal frame 31-1b of the 1-1 metal frame 31-1 can be electrically coupled to a ground member of the first electronic device 31 in at least one location. According to various example embodiments, the 1-2b metal frame 31-2b of the 1-2 metal frame 31-2 can be electrically coupled to the ground member of the first electronic device 31 in at least one location. According to various example embodiments, a metal frame including the 1-1a metal frame 31-1a of the 1-1 metal frame 31-1, the 1-3 metal frame 31-3 and the 1-2a metal frame 31-2a of the 1-2 metal frame 31-2 can be electrically coupled to the ground member of the electronic device 300 in at least one location. According to various example embodiments, a metal frame including the 1-1c metal frame 31-1c of the 1-1 metal frame 31-1, the 1-4 metal frame 31-4 and the 1-2c metal frame 31-2c of the 1-2 metal frame 31-2 can be electrically coupled to the ground member of the electronic device 300 in at least one location.

According to various example embodiments, the 1-1b metal frame 31-1b of the 1-1 metal frame 31-1 can be formed in an electrical floating state. According to various example embodiments, the 1-2b metal frame 31-2b of the 1-2 metal frame 31-2 can be formed in the electrical floating state. According to various example embodiments, a metal frame including the 1-1a metal frame 31-1a of the 1-1 metal frame 31-1, the 1-3 metal frame 31-3 and the 1-2a metal frame 31-2a of the 1-2 metal frame 31-2 can be formed in the electrical floating state. According to various example embodiments, a metal frame including the 1-1c metal frame 31-1c of the 1-1 metal frame 31-1, the 1-4 metal frame 31-4 and the 1-2c metal frame 31-2c of the 1-2 metal frame 31-2 can be formed in the electrical floating state.

According to various example embodiments, the first bezel 310 can include a through-hole for supporting various components of the first electronic device 310. For example, the 1-2b metal frame 31-2b of the first bezel 310 can include a through-hole 3191 for supporting a speaker. According to various example embodiments, the 1-2b metal frame 31-2b of the first bezel 310 can include a through-hole 3192 for supporting a connector. According to various example embodiments, the 1-2b metal frame 310-2b of the first bezel 310 can include a through-hole 3193 for supporting a microphone. The through-holes 3191, 3192 and 3193, one of elements deciding a shape of the first bezel 310, can be associated with a resonance characteristic of the wireless communication device that uses the first bezel 310.

According to an example embodiment, the electronic device 300 can include a second housing portion 3200 that forms the entire or at least one portion of an exterior of the second electronic device 32. According to various example embodiments, the second housing portion 3200 can include nonmetallic materials and/or metallic materials. For example, the second housing portion 3200 can be formed of materials such as a plastic, a metal, a carbon fiber, other fiber composites, a ceramic, a glass and a timber or a combination of these materials. Or, the second housing portion 3200 can be entirely formed of one material or a combination of a majority of materials. According to various example embodiments, the second housing portion 3200 can be partially formed of materials whose physical properties are different as well.

According to an example embodiment, the second housing portion 3200 can form a 2-1 surface 3200-1, a 2-2 surface 3200-2 and a 2-3 surface 3200-3. The 2-1 surface 3200-1 and 2-2 surface 3200-2 of the second housing portion 3200 can look to mutually opposite directions. The 2-3 surface 3200-3 can surround at least a part of a space between the 2-1 surface 3200-1 and the 2-2 surface 3200-2.

According to an example embodiment, the 2-1 surface 3200-1 and/or 2-2 surface 3200-2 of the second housing portion 3200 can be substantially a plane. The 2-3 surface 3200-3 of the second housing portion 3200 can include a plane or a curved surface.

According to an example embodiment, the second housing portion 3200 can include a 2-1 cover 320-1 forming the 2-1 surface 3200-1 and/or a 2-2 cover 320-2 forming the 2-2 surface 3200-2. The second housing portion 3200 can include a second bezel 320 that surrounds a space between the 2-1 cover 320-1 and the 2-2 cover 320-2 and forms the 2-3 surface (or second side surface) 3200-3.

According to an example embodiment, the second electronic device 32 can include a second display 321 that is built in a space provided by the 2-1 cover 320-1 and 2-2 cover 320-2 of the second housing portion 3200. A screen region of the second display 321 can be exposed to the external through the 2-1 cover 320-1. According to various example embodiments, the second display 321 can further include a touch sensing device for a touch input and/or a hovering input. For example, in case where a finger or a stylus comes in contact with the 2-1 surface 3200-1, the second electronic device 32 and/or the first electronic device 31 can sense a touch input through the second display 321. According to various example embodiments, in case where the finger or the stylus is isolated adjacently from the 2-1 surface 3200-1, the second electronic device 32 and/or the first electronic device 31 can sense a hovering input using the second display 321.

According to various example embodiments, the second display 321 can include a conductive pattern for a touch input or a hovering input. For example, the conductive pattern can be arranged within the second display 321. According to an example embodiment, the conductive pattern can be arranged in an in-cell region of the second display 321. According to another example embodiment, the conductive pattern can be arranged in an on-cell region of the second display 321. According to various example embodiments, the conductive pattern can at least partially include aluminum (Al), copper (Cu), argentum (Ag), graphene, Indium-Tin-Oxide (ITO), or Indium-Zinc-Oxide (IZO).

According to various example embodiments, the second display 321 can be a touch screen integrated display. For instance, the second display 321 can include an AMOLED integrated touch screen (e.g., On-Cell TSP AMOLED (OCTA)).

According to various example embodiments, the second display 321 can be a display of a similar or the same type as that of the first display 311, or be a display of a different type from that of the first display 311.

According to an example embodiment, a screen region of the second display 321 can be a rectangular form that includes a first short side 321-1, a second short side 321-2, a first long side 321-3 and a second long side 321-4.

According to an example embodiment, the 2-1 cover 320-1 can be a rectangular form that includes a first edge 320-11 abutting on the first short side 321-1 of the screen region, a second edge 320-12 abutting on the second short side 321-2 of the screen region, a 3rd edge 320-13 abutting on the 3rd long side 321-3 of the screen region, and a 4th edge 320-14 abutting on the 4th long side 321-4 of the screen region. The 3rd edge 320-13 can couple one end of the first edge 320-11 and one end of the second edge 320-12. The 4th edge 320-14 can couple the other end of the first edge 320-11 and the other end of the second edge 320-12. A coupling portion between the first edge 320-11 and the 3rd edge 320-13 can be a curve form. A coupling portion between the first edge 320-11 and the 4th edge 320-14 can be a curve form. A coupling portion between the second edge 320-12 and the 3rd edge 320-13 can be a curve form. According to various example embodiments, a coupling portion between the second edge 320-12 and the 4th edge 320-14 can be a curve form.

According to an example embodiment, when viewing in the direction going from the 2-1 cover 320-1 to the 2-2 cover 320-2, the 2-2 cover 320-2 can be an approximately rectangular form corresponding to the 2-1 cover 320-1.

According to various example embodiments, the second electronic device 32 can include various components (e.g., a speaker, a sensor, an input device, etc.) that are arranged between the first edge 320-11 of the 2-1 cover 320-1 and the first short side 321-1 of the screen region. According to various example embodiments, the second electronic device 32 can include various components that are arranged between the second edge 320-12 of the 2-1 cover 320-1 and the second short side 321-2 of the screen region.

According to an example embodiment, the 2-1 cover 320-1 and/or the 2-30 2 cover 320-2 can be formed of light transmission materials (e.g., glass).

According to an example embodiment, the second bezel 320 can include a 2-1 metal frame 32-1 abutting on the first edge 320-11 of the 2-1 cover 320-1, a 2-2 metal frame 32-2 abutting on the second edge 320-12 of the 2-1 cover 320-1, a 2-3 metal frame 32-3 abutting on the 3rd edge 320-13 of the 2-1 cover 320-1, and a 2-4 metal frame 32-4 abutting on the 4th edge 320-14 of the 2-1 cover 320-1. The 2-1 metal frame 32-1 and the 2-2 metal frame 32-2 can be arranged at mutually opposite sides, and the 2-3 metal frame 32-3 and the 2-4 metal frame 32-4 can be arranged at mutually opposite sides. The 2-1 metal frame 32-1 can couple one end of the 2-3 metal frame 32-3 and one end of the 2-4 metal frame 32-4. The 2-2 metal frame 32-2 can couple the other end of the 2-3 metal frame 32-3 and the other end of the 2-4 metal frame 32-4. A combination of the 2-1 metal frame 32-1, the 2-2 metal frame 32-2, the 2-3 metal frame 32-3 and the 2-4 metal frame 32-4 can be a ring shape of an approximately rectangular form. The 2-3 surface 3200-3 of the second housing portion 3200 formed by the second bezel 320 can have an approximately rectangular ring form.

According to various example embodiments, a coupling portion between the 2-1 metal frame 32-1 of the second bezel 320 and the 2-3 metal frame 32-3 thereof can have a curve form. A coupling portion between the 2-1 metal frame 32-1 of the second bezel 320 and the 2-4 metal frame 32-4 thereof can have a curve form. A coupling portion between the 2-2 metal frame 32-2 of the second bezel 320 and the 2-3 metal frame 32-3 thereof can have a curve form. According to various example embodiments, a coupling portion between the 2-2 metal frame 32-2 of the second bezel 320 and the 2-4 metal frame 32-4 thereof can have a curve form.

According to various example embodiments, though not illustrated, the second bezel 320 can include an extension portion (not shown) that is extended towards the inside of the second housing portion 3200 from at least one of the 2-1 metal frame 32-1, the 2-2 metal frame 32-2, the 2-3 metal frame 32-3 and the 2-4 metal frame 32-4.

According to an example embodiment, at least one of the 2-1 metal frame 32-1, the 2-2 metal frame 32-2, the 2-3 metal frame 32-3 and the 2-4 metal frame 32-4 of the second bezel 320 can include a majority of metal portions (or conductive portions) that are isolated mutually physically. A nonconductive member can be arranged between the majority of metal portions. The nonconductive member can form a part of the 2-3 surface 3200-3 of the second housing portion 3200. According to various example embodiments, the nonconductive member can be a member extended from a nonconductive portion that is arranged within the second housing portion 3200.

According to an example embodiment, the 2-1 metal frame 32-1 of the second bezel 320 can include a 2-1a metal frame 32-1a, a 2-1b metal frame 32-1b and a 2-1c metal frame 32-1c that are isolated mutually physically. The 2-1b metal frame 32-1b can be arranged between the 2-1a metal frame 32-1a and the 2-1c metal frame 32-1c.

According to an example embodiment, the 2-1a metal frame 32-1a of the 2-1 metal frame 32-1 can be coupled to the 2-3 metal frame 32-3. The 2-1c metal frame 32-1c of the 2-1 metal frame 32-1 can be coupled to the 2-4 metal frame 32-4. The 2-1a metal frame 32-1a and the 2-3 metal frame 32-3 can be formed of one-piece metal. According to various example embodiments, the 2-1c metal frame 32-1c and the 2-4 metal frame 32-4 can be formed of one-piece metal.

According to an example embodiment, the second electronic device 32 can include a 5th nonconductive member 345 that is arranged between the 2-1a metal frame 32-1a of the second bezel 320 and the 2-1b metal frame 32-1b thereof. The second electronic device 32 can include a 6th nonconductive member 346 that is arranged between the 2-1b metal frame 32-1b and the 2-1c metal frame 32-1c. The 5th nonconductive member 345 and the 6th nonconductive member 346 can be smoothly coupled with the 2-1 metal frame 32-1, and form a part of the 2-3 surface 3200-3 of the second housing portion 3200. The 5th nonconductive member 345 and/or the 6th nonconductive member 346 can be a portion extended from the nonconductive member that is arranged within the second housing portion 3200.

According to an example embodiment, the second electronic device 32 can be a shape of being approximately symmetrical at both sides of a center line (C2) heading from the 2-1 metal frame 32-1 to the 2-2 metal frame 32-2. The center line (C2) exists between the 5th nonconductive member 345 and the 6th nonconductive member 346, and the 5th nonconductive member 345 and the 6th nonconductive member 346 can be arranged at the same distance from the center line (C2). According to various example embodiments, the 5th nonconductive member 345 and the 6th nonconductive member 346 may not be arranged at the same distance from the center line (C2).

According to an example embodiment, a 5th gap (G5) between the 2-1a metal frame 32-1a and the 2-1b metal frame 32-1b can be a portion filled with the 5th nonconductive member 345. A 6th gap (G6) between the 2-1b metal frame 32-1b and the 2-1c metal frame 32-1c can be a portion filled with the 6th nonconductive member 346. Widths of the 5th gap (G5) and the 6th gap (G6) can be the same as or be different from each other.

According to an example embodiment, the 2-2 metal frame 32-2 of the second bezel 320 can include a 2-2a metal frame 32-2a, a 2-2b metal frame 32-2b and a 2-2c metal frame 32-2c that are isolated mutually physically. The 2-2b metal frame 32-2b can be arranged between the 2-2a metal frame 32-2a and the 2-2c metal frame 32-2c.

According to an example embodiment, the 2-2a metal frame 32-2a of the 2-2 metal frame 32-2 can be coupled to the 2-3 metal frame 32-3. The 2-2c metal frame 32-2c of the 2-2 metal frame 32-2 can be coupled to the 2-4 metal frame 32-4. The 2-2a metal frame 32-2a and the 2-3 metal frame 32-3 can be formed of one-piece metal. According to various example embodiments, the 2-2c metal frame 32-2c and the 2-4 metal frame 32-4 can be formed of one-piece metal.

According to various example embodiments, a combination of the 2-1a metal frame 32-1a, the 2-3 metal frame 32-3 and the 2-2a metal frame 32-2a can be an approximately 'U' shape. According to various example embodiments, a combination of the 2-1c metal frame 32-1c, the 2-4 metal frame 32-4 and the 2-2c metal frame 32-2c can be an approximately 'U' shape.

According to an example embodiment, the second electronic device 32 can include a 7th nonconductive member 347 that is arranged between the 2-2a metal frame 32-2a of the second bezel 320 and the 2-2b metal frame 32-2b thereof. The second electronic device 32 can include an 8th nonconductive member 348 that is arranged between the 2-2b metal frame 32-2b and the 2-2c metal frame 32-2c. The 7th nonconductive member 347 and the 8th nonconductive member 348 can be smoothly coupled with the 2-2 metal frame 32-2, and form a part of the 2-3 surface 3200-3 of the second housing portion 3200. The 7th nonconductive member 347 and/or the 8th nonconductive member 348 can be a portion extended from a nonconductive member that is arranged within the second housing portion 3200.

According to an example embodiment, the center line (C2) exists between the 7th nonconductive member 347 and the 8th nonconductive member 348, and the 7th nonconductive member 347 and the 8th nonconductive member 348 can be arranged at the same distance from the center line (C2). According to various example embodiments, the 7th nonconductive member 347 and the 8th nonconductive member 348 may not be arranged at the same distance from the center line (C2).

According to an example embodiment, a 7th gap (G7) between the 2-2a metal frame 32-2a and the 2-2b metal frame 32-2b can be a portion filled with the 7th nonconductive member 347. An 8th gap (G8) between the 2-2b metal frame 32-2b and the 2-2c metal frame 32-2c can be a portion filled with the 8th nonconductive member 348. Widths of the 7th gap (G7) and the 8th gap (G8) can be the same as or be different from each other.

According to an example embodiment, the 5th nonconductive member 345 and the 7th nonconductive member 347 may be either arranged at the same distance from the center line (C2), or not be arranged at the same distance.

According to an example embodiment, the 6th nonconductive member 346 and the 8th nonconductive member 348 may be either arranged at the same distance from the center line (C2), or not be arranged at the same distance.

According to various example embodiments, at least some of the first to 8th nonconductive members 341, 342, 343, 344, 345, 346, 347 and 348 can be of the same materials or mutually different materials.

According to various example embodiments, the electronic device 300 can further include at least an another gap provided in at least one of the first bezel 310 and the second bezel 320 and a nonconductive member arranged in this gap, as well as the first to 8th gaps (G1, G2, G3, G4, G5, G6, G7 and G8).

According to an example embodiment, the second bezel 320 can be constructed as at least a part of a wireless communication device. Through electrical coupling between the 2-1 metal frame 32-1, the 2-2 metal frame 32-2, the 2-3 metal frame 32-3 and the 2-4 metal frame 32-4, the second bezel 320 can be used as at least a part of the wireless communication device of the electronic device 300 capable of transmitting/receiving a wireless signal. For example, at least a part of the second bezel 320 can be formed in a 'first state' of being electrically coupled to a communication circuit of the electronic device 300, to play a role of an antenna radiator. According to various example embodiments, the at least part of the second bezel 320 can be formed in a 'second state' of being electrically coupled to a ground member (e.g., the ground of a PCB) of the 10 electronic device 300, to play a role of an antenna ground. According to various example embodiments, the at least part of the second bezel 320 can be formed in a '3rd state' that is an electrical floating state as well.

According to various example embodiments, at least one portion of the 2-1b metal frame 32-1b of the 2-1 metal frame 32-1 can be formed in at least one of the 'first state' and the 'second state', or be formed in the '3rd state'. At least one portion of the 2-2b metal frame 32-2b of the 2-2 metal frame 32-2 can be formed in at least one of the 'first state' and the 'second state', or be formed in the '3rd state'. At least one portion of a metal frame including the 2-1a metal frame 32-1a of the 2-1 metal frame 32-1, the 2-3 metal frame 32-3 and the 2-2a metal frame 32-2a of the 2-2 metal frame 32-2 can be formed in at least one of the 'first state' and the 'second state', or be formed in the '3rd state'. According to various example embodiments, at least one portion of a metal frame including the 2-1c metal frame 32-1c of the 2-1 metal frame 32-1, the 2-4 metal frame 32-4 and the 2-2c metal frame 32-2c of the 2-2 metal frame 32-2 can be formed in at least one of the 'first state' and the 'second state', or be formed in the '3rd state'.

According to various example embodiments, the 2-1b metal frame 32-1b of the 2-1 metal frame 32-1 can be electrically coupled to a communication circuit of the electronic device 300 in at least one location. According to various example embodiments, the 2-2b metal frame 32-2b of the 2-2 metal frame 32-2 can be electrically coupled to the communication circuit of the electronic device 300 in at least one location. According to various example embodiments, a metal frame including the 2-1a metal frame 32-1a of the 2-1 metal frame 32-1, the 2-3 metal frame 32-3 and the 2-2a metal frame 32-2a of the 2-2 metal frame 32-2 can be electrically coupled to the communication circuit of the electronic device 300 in at least one location. According to various example embodiments, a metal frame including the 2-1c metal frame 32-1c of the 2-1 metal frame 32-1, the 2-4 metal frame 32-4 and the 2-2c metal frame 32-2c of the 2-2 metal frame 32-2 can be electrically coupled to the communication circuit of the electronic device 300 in at least one location.

According to various example embodiments, the 2-1b metal frame 32-1b of the 2-1 metal frame 32-1 can be electrically coupled to a ground member of the second electronic device 32 in at least one location. According to various example embodiments, the 2-2b metal frame 32-2b of the 2-2 metal frame 32-2 can be electrically coupled to the ground member of the second electronic device 32 in at least one location. According to various example embodiments, a metal frame including the 2-1a metal frame 32-1a of the 2-1 metal frame 32-1, the 2-3 metal frame 32-3 and the 2-2a metal frame 32-2a of the 2-2 metal frame 32-2 can be electrically coupled to the ground member of the electronic device 300 in at least one location. According to various example embodiments, a metal frame including the 2-1c metal frame 32-1c of the 2-1 metal frame 32-1, the 2-4 metal frame 32-4 and the 2-2c metal frame 32-2c of the 2-2 metal frame 32-2 can be electrically coupled to the ground member of the electronic device 300 in at least one location.

According to various example embodiments, the 2-1b metal frame 32-1b of the 2-1 metal frame 32-1 can be formed in an electrical floating state. According to various example embodiments, the 2-2b metal frame 32-2b of the 2-2 metal frame 32-2 can be formed in the electrical floating state. According to various example embodiments, a metal frame including the 2-1a metal frame 32-1a of the 2-1 metal frame 32-1, the 2-3 metal frame 32-3 and the 2-2a metal frame 32-2a of the 2-2 metal frame 32-2 can be formed in the electrical floating state. According to various example embodiments, a metal frame including the 2-1c metal frame 32-1c of the 2-1 metal frame 32-1, the 2-4 metal frame 32-4 and the 2-2c metal frame 32-2c of the 2-2 metal frame 32-2 can be formed in the electrical floating state.

According to an example embodiment, the electronic device 300 can include non-shown communication circuit and control circuit (e.g., the processor 120 of FIG. 1 or the processor 210 of FIG. 2). The communication circuit can be included in a wireless communication device that uses at least a part of the first bezel 310 of the first electronic device 31 and the second bezel 320 of the second electronic device 32. The communication circuit can convert a wireless signal received from the external through at least a part of the first bezel 310 and the second bezel 320, into a baseband signal, and forward the baseband signal to the control circuit. The control circuit can forward a baseband signal to the communication circuit, and the communication circuit can convert the baseband signal into a wireless signal, and transmit the wireless signal to the air through at least a part of the first bezel 310 and the second bezel 320.

According to an example embodiment, the communication circuit can support communication of various forms that use at least a part of the first bezel 310 and the second bezel 320. For example, the communication circuit can support cellular communication and/or short-range communication (e.g., WiFi, Bluetooth, NFC, GNSS, etc.). Or, the communication circuit can support transmission/reception of a magnetic signal (e.g., Magnetic Secure Transmission (MST) for electronic payment) as well.

The communication circuit can include all Radio Frequency (RF) components between at least a part of the first bezel 310 and/or the second bezel 320 and the control circuit. For example, the communication circuit can include a Radio Frequency Integrated Circuit (RFIC) and/or a Front End Module (FEM). The RFIC (e.g., RF transceiver) can receive an electric wave from a base station, and modulate the received high frequency into a low frequency band (i.e., baseband) that can be processed in the control circuit. For example, the RFIC can modulate a low frequency that is processed in the control circuit, into a high frequency for the sake of base station transmission. For example, the FEM can be a transmission/reception device that is able to control an electric wave signal. For example, the FEM can connect at least one of the first bezel 310 and the second bezel 320 and the RFIC, and isolate a transmission/reception signal. For example, the FEM can play a role of filtering and amplification, and can include a receive end front end module that embeds a filter filtering a reception signal, and/or a transmit end front end module that embeds a Power Amplifier Module (PAM) amplifying a transmission signal.

The communication circuit can use at least a part of the first bezel 310 and the second bezel 320, to support at least one communication scheme among Single Input Multiple Output (SIMO), Multiple Input Single Output (MISO), diversity or Multiple Input Multiple Output (MIMO).

According to an example embodiment, the electronic device 300 can include a memory. The memory can store instructions of enabling the control circuit to perform at least one operation of the electronic device 300, at least partially based on a signal received from the communication circuit that uses at least a part of the first bezel 310 and the second bezel 320. For example, the control circuit can control displaying through at least one of the first display 311 and the second display 321, at least partially based on a signal received through at least a part of the first bezel 310 and the second bezel 320.

According to an example embodiment, the communication circuit can be mounted in the first electronic device 31 or the second electronic device 32. Or, the control circuit can be mounted in the first electronic device 31 or the second electronic device 32. For example, the communication circuit and the control circuit are installed in the first electronic device 31, and the second electronic device 32 can be a sub construction of the first electronic device 31. The second electronic device 32 can be constructed as an additional output device of the first electronic device 31. For example, the second electronic device 32 can output through the second display 321 an image signal (e.g., communication related signal) forwarded from the first electronic device 31. Or, the second electronic device 32 can be constructed as an additional input device of the first electronic device 31. For example, a touch input and/or a hovering input (e.g., communication related input) that are sensed using the second display 321 of the second electronic device 32 can be forwarded to the first electronic device 31.

According to another example embodiment, the communication circuit can include a first communication circuit installed in the first electronic device 31 and a second communication circuit installed in the second electronic device 32. Or, the control circuit can include a first control circuit (e.g., a first processor) installed in the first electronic device 31 and a second control circuit (e.g., a second processor) installed in the second electronic device 32. The control circuit of the first electronic device 31 and the control circuit of the second electronic device can exchange a signal for an operation of the electronic device 300.

According to various example embodiments, the first bezel 310 and/or the second bezel 320 can be formed of aluminum, stainless, amorphous metal alloy, etc.

According to an example embodiment, the hinge 33 can couple the 1-3 metal frame 31-3 of the first electronic device 31 and the 2-4 metal frame 32-4 of the second electronic device 32. The hinge 33 can be arranged between the center line (C1) of the first electronic device 31 and the center line (C2) of the second electronic device 32, and be at the same distance from the two center lines (C1 and C2).

According to an example embodiment, the hinge 33 can include a member (e.g., Flexible Printed Circuit Board (FPCB)) that electrically couples the first electronic device 31 and the second electronic device 32, and nonconductive materials surrounding this.

According to an example embodiment, the hinge 33 can include a member that electrically couples the first electronic device 31 and the second electronic device 32, and metal materials surrounding this. The metal materials can abut on or be physically combined to the 1-3 metal frame 31-3 of the first electronic device 31 and the 2-4 metal frame 32-4 of the second electronic device 32. According to various example embodiments, the metal materials can be in a state of being electrically coupled to the 1-3 metal frame 31-3 of the first electronic device 31 and/or the 2-4 metal frame 32-4 of the second electronic device 32.

Figure 3D:
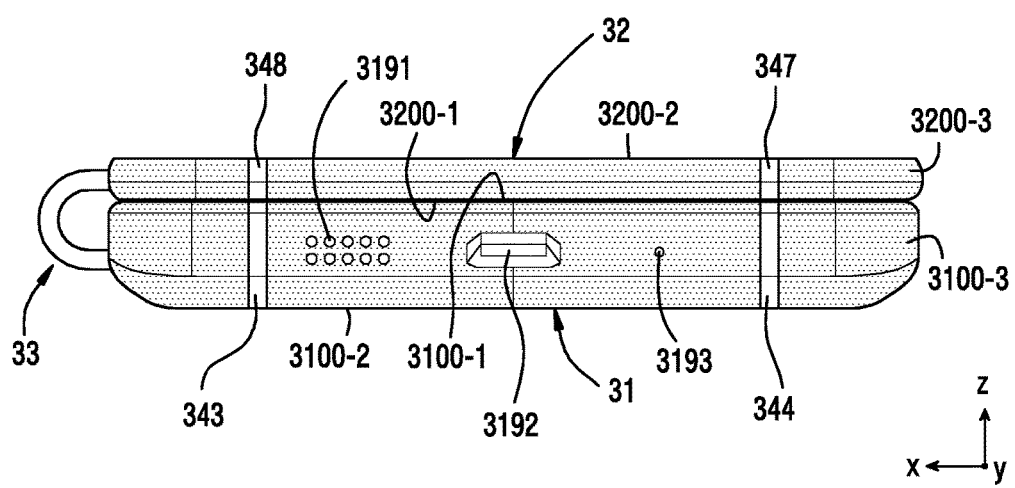

Referring to FIG. 3D, the electronic device 300 can be in a first folding state. For example, the first folding state can represents a state in which the second electronic device 32 is not rotated in an opening direction with respect to the first electronic device 31. In the first folding state of the electronic device 300, the second electronic device 32 can cover at least a part of the 1-1 surface 3100-1 of the first electronic device 31. The 2-1 surface 3200-1 of the second electronic device 32 can come in touch with the 1-1 surface 3100-1 of the first electronic device 31.

According to various example embodiments, in case of the first folding state, the first bezel 310 of the first housing portion 3100 and the second bezel 320 of the second housing portion 3200 can abut mutually. That the first bezel 310 of the first housing portion 3100 and the second bezel 320 of the second housing portion 3200 abut on each other can represent a state in which the first bezel 310 and the second bezel 320 come in contact, or almost come in contact with each other at a little interval (e.g., within approximately 10 mm).

In the first folding state of the electronic device 300, the first display 311 of the first electronic device 31 is hidden by the second electronic deice 32 and thus may not be exposed. In the first folding state of the electronic device 300, the second display 321 of the second electronic device 32 is hidden by the first electronic deice 31 and thus may not be exposed.

In the first folding state of the electronic device 300, the 1-2 surface 3100-2 of the first electronic device 31 and the 2-2 surface 3200-2 of the second electronic device 32 can be exposed to the external. According to various example embodiments, the second electronic device 32 can further include a 3rd display (not shown) that is embedded within a space provided by the second housing portion 3200. A screen region of the 3rd display can be exposed to the external through the 2-2 surface 3200-2. According to various example embodiments, the 3rd display can further include a touch sensing device for a touch input and/or a hovering input. For example, in case where a finger or a stylus comes in contact with the 2-2 surface 3200-2, the first electronic device 31 and/or the second electronic device 32 can sense a touch input through the 3rd display. According to various example embodiments, in case where the finger or the stylus is isolated adjacently from the 2-2 surface 3200-2, the first electronic device 31 and/or the second electronic device 32 can sense a hovering input through the 3rd display.

According to an example embodiment, the electronic device 300 can sense the first folding state through at least one sensor, and set the first display 311 of the first electronic device 31 and the second display 321 of the second electronic device 32 to a disable state.

According to an example embodiment, in the first folding state of the electronic device 300, the electronic device 300 can set the 3rd display of the second electronic device 32 to an enable state or a disable state in response to the generation of at least one input. For example, in case where a wireless signal (e.g., call reception, a short message, an SMS message, etc.) is received from the external, the electronic device 300 can set the 3rd display of the second electronic device 32 to the enable state, and display a related image through the 3rd display, and additionally sense the generation of a touch input and a hovering input through the 3rd display.

According to an example embodiment, in the first folding state of the electronic device 300, the first bezel 310 of the first electronic device 31 and the second bezel 320 of the second electronic device 32 can become in proximity to each other. For example, the 1-1 metal frame 31-1 of the first bezel 310 and the 2-1 metal frame 32-1 of the second bezel 320 can come in touch or get in proximity. The 1-2 metal frame 31-2 of the first bezel 310 and the 2-2 metal frame 32-2 of the second bezel 320 can come in touch or get in proximity. The 1-3 metal frame 31-3 of the first bezel 310 and the 2-4 metal frame 32-4 of the second bezel 320 can come in touch or get in proximity. The 1-4 metal frame 31-4 of the first bezel 310 and the 2-3 metal frame 32-3 of the second bezel 320 can come in touch or get in proximity.

According to an example embodiment, the first bezel 310 of the first electronic device 31 and the second bezel 320 of the second electronic device 32 can play a role of an antenna of the electronic device 300. For example, in the first folding state of the electronic device 300, the electronic device 300 can perform wireless communication of various forms through a resonance that is formed through electromagnetic coupling between the first bezel 310 and the second bezel 320.

For the sake of antenna radiation performance improvement, an arrangement relationship between the gaps (G1, G2, G3 and G4) of the electronic device 300 can be configured diversely.

According to an example embodiment, the first gap (G1) provided in the 1-1 metal frame 31-1 of the first bezel 310 and the 6th gap (G6) provided in the 2-1 metal frame 32-1 of the second bezel 320 can be configured to be substantially aligned, when viewing from the 3rd surfaces 3100-3 and/or 3200-3 of the electronic device 300, in the first folding state of the electronic device 300.

According to an example embodiment, the second gap (G2) provided in the 1-1 metal frame 31-1 of the first bezel 310 and the 5th gap (G5) provided in the 2-1 metal frame 32-1 of the second bezel 320 can be configured to be substantially aligned, when viewing from the 3rd surfaces 3100-3 and/or 3200-3 of the electronic device 300, in the first folding state of the electronic device 300.

According to an example embodiment, the 3rd gap (G3) provided in the 1-2 metal frame 31-2 of the first bezel 310 and the 8th gap (G8) provided in the 2-2 metal frame 32-2 of the second bezel 320 can be configured to be substantially aligned, when viewing from the 3rd surfaces 3100-3 and/or 3200-3 of the electronic device 300, in the first folding state of the electronic device 300.

According to an example embodiment, the 4th gap (G4) provided in the 1-2 metal frame 31-2 of the first bezel 310 and the 7th gap (G7) provided in the 2-2 metal frame 32-2 of the second bezel 320 can be configured to be substantially aligned, when viewing from the 3rd surfaces 3100-3 and/or 3200-3 of the electronic device 300, in the first folding state of the electronic device 300.

Figure 3E:
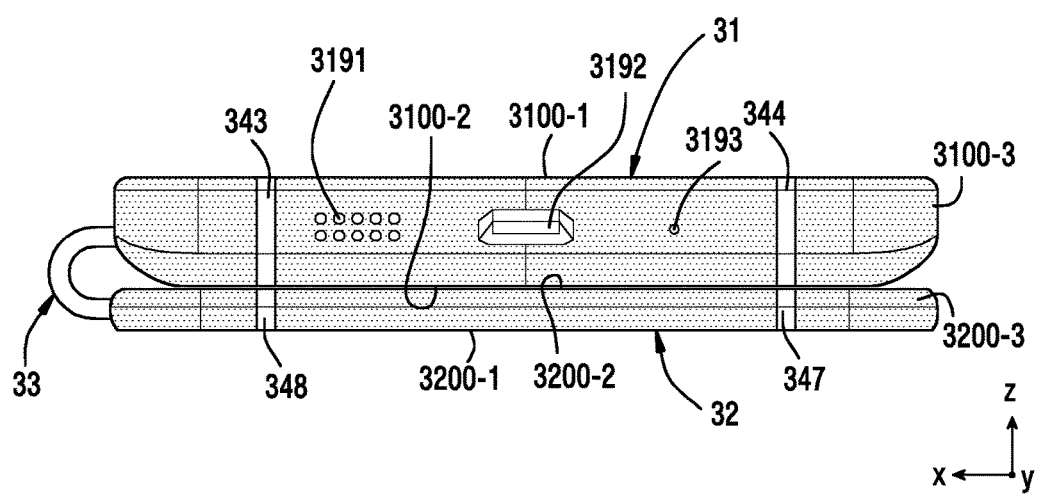

Referring to FIG. 3E, the electronic device 300 can be in a second folding state. For example, the second folding state can represent a state in which the second electronic device 32 is rotated to the maximum in an opening direction with respect to the first electronic device 31. In the second folding state of the electronic device 300, the second electronic device 32 can cover at least a part of the 1-2 surface 3100-2 of the first electronic device 31. The 2-2 surface 3200-2 of the second electronic device 32 can come in touch with the 1-2 surface 3100-2 of the first electronic device 31.

According to various example embodiments, in case of the second folding state, the first bezel 310 of the first housing portion 3100 and the second bezel 320 of the second housing portion 3200 can abut mutually. That the first bezel 310 of the first housing portion 3100 and the second bezel 320 of the second housing portion 3200 abut on each other can represent a state in which the first bezel 310 and the second bezel 320 come in contact, or almost come in contact with each other at a little interval (e.g., within approximately 10 mm).

In the second folding state of the electronic device 300, the first display 311 of the first electronic device 31 can be exposed to the external. In the second folding state of the electronic device 300, the second display 321 of the second electronic device 32 can be exposed to the external.

According to an example embodiment, the electronic device 300 can sense the second folding state through at least one sensor, and selectively set at least one of the first display 311 of the first electronic device 31 and the second display 321 of the second electronic device 32 to an enable state. For example, the electronic device 300 of the second folding state can check a screen looking opposite to the gravity direction, using various elements such as a 3-axis sensor, a 6-axis sensor, etc., and set a display corresponding to this screen to be available to be in the enable state. For example, in case where a wireless signal (e.g., call reception, a short message, an SMS message, etc.) is received from the external, the electronic device 300 of the second folding state can check a surface looking opposite to the gravity direction, and select a display corresponding to this surface and set the display to the enable state, and display a related image through the set display.

According to an example embodiment, in the second folding state of the electronic device 300, the first bezel 310 of the first electronic device 31 and the second bezel 320 of the second electronic device 32 can become in proximity to each other. For example, the 1-1 metal frame 31-1 of the first bezel 310 and the 2-1 metal frame 32-1 of the second bezel 320 can come in touch or get in proximity. The 1-2 metal frame 31-2 of the first bezel 310 and the 2-2 metal frame 32-2 of the second bezel 320 can come in touch or get in proximity. The 1-3 metal frame 31-3 of the first bezel 310 and the 2-4 metal frame 32-4 of the second bezel 320 can come in touch or get in proximity. The 1-4 metal frame 31-4 of the first bezel 310 and the 2-3 metal frame 32-3 of the second bezel 320 can come in touch or get in proximity.

According to various example embodiments, the first bezel 310 of the first electronic device 31 and the second bezel 320 of the second electronic device 32 can play a role of an antenna of the electronic device 300. For example, in the second folding state of the electronic device 300, the electronic device 300 can perform wireless communication of various forms through a resonance that is formed through electromagnetic coupling between the first bezel 310 and the second bezel 320.

For the sake of antenna radiation performance improvement, an arrangement relationship between the gaps (G1, G2, G3, and G4) of the electronic device 300 can be formed variously.

According to an example embodiment, the first gap (G1) provided in the 1-1 metal frame 31-1 of the first bezel 310 and the 6th gap (G6) provided in the 2-1 metal frame 32-1 of the second bezel 320 can be provided to be substantially aligned, when viewing from the 3rd surfaces 3100-3 and/or 3200-3 of the electronic device 300, in the second folding state of the electronic device 300.

According to an example embodiment, the second gap (G2) provided in the 1-1 metal frame 31-1 of the first bezel 310 and the 5th gap (G5) provided in the 2-1 metal frame 32-1 of the second bezel 320 can be provided to be substantially aligned, when viewing from the 3rd surfaces 3100-3 and/or 3200-3 of the electronic device 300, in the second folding state of the electronic device 300.

According to an example embodiment, the 3rd gap (G3) provided in the 1-2 metal frame 31-2 of the first bezel 310 and the 8th gap (G8) provided in the 2-2 metal frame 32-2 of the second bezel 320 can be provided to be substantially aligned, when viewing from the 3rd surfaces 3100-3 and/or 3200-3 of the electronic device 300, in the second folding state of the electronic device 300.

According to an example embodiment, the 4th gap (G4) provided in the 1-2 metal frame 31-2 of the first bezel 310 and the 7th gap (G7) provided in the 2-2 metal frame 32-2 of the second bezel 320 can be provided to be substantially aligned, when viewing from the 3rd surfaces 3100-3 and/or 3200-3 of the electronic device 300, in the second folding state of the electronic device 300.

Though not illustrated, the electronic device 300 can be in an unfolding state. For example, the unfolding state can represent a state in which the second electronic device 32 is rotated with respect to the first electronic device 31 but is not rotated to the maximum. For example, the unfolding state can include a state in which the second electronic device 32 is rotated at an angle of 180 degrees as in FIG. 3B.

According to various example embodiments, in the unfolding state of the electronic device 300, the electronic device 300 can perform wireless communication of various forms through a resonance that is formed through electromagnetic coupling between the first bezel 310 and the second bezel 320.

According to various example embodiments, the hinge 33 can include a member (e.g., FPCB) electrically coupling the first electronic device 31 and the second electronic device 32, and nonconductive materials surrounding this. According to various example embodiments, the hinge 33 can include a member electrically coupling the first electronic device 31 and the second electronic device 32, and metal materials surrounding this. The metal materials can abut on or be physically combined to the 1-3 metal frame 31-3 of the first electronic device 31 and the 2-4 metal frame 32-4 of the second electronic device 32. According to various example embodiments, the metal materials can be in a state of being electrically coupled to the 1-3 metal frame 31-3 of the first electronic device 31 and/or the 2-4 metal frame 32-4 of the second electronic device 32.

The hinge 33 can deteriorate antenna radiation performance in the first folding state, the second folding state or the unfolding state.

For example, the FPCB of the hinge 33 electrically connecting the first electronic device 31 and the second electronic device 32 can deteriorate the antenna radiation performance of the wireless communication device that uses at least a part of the first bezel 310 and the second bezel 320 as an antenna.

For example, the metal materials of at least one portion of the hinge 33 for physically coupling between the first electronic device 31 and the second electronic device 32 can deteriorate the antenna radiation performance of the wireless communication device that uses at least a part of the first bezel 310 and the second bezel 320 as the antenna.

For example, in accordance with the first folding state, the second folding state or the unfolding state of the electronic device 300, the form of the hinge 33 can become different, and this can deteriorate the antenna radiation performance of the wireless communication device that uses at least a part of the first bezel 310 and the second bezel 320 as the antenna.

For example, in accordance with the first folding state, the second folding state or the unfolding state of the electronic device 300, an arrangement relationship between the hinge 33, the first bezel 310 and the second bezel 320 can become different, and this can deteriorate the antenna radiation performance of the wireless communication device that uses at least a part of the first bezel 310 and the second bezel 320 as the antenna.

For example, the hinge 33 can be a factor of changing an electrical length of the antenna that uses at least a part of the first bezel 310 and the second bezel 320, and this can deteriorate the antenna radiation performance of the wireless communication device.

According to an example embodiment, to improve the degradation of the antenna radiation performance caused by the hinge 33, the hinge 33 can be formed to decrease a size of the hinge 33 that couples the first electronic device 31 and the second electronic device 32.

According to an example embodiment, to improve the degradation of the antenna radiation performance caused by the hinge 33, one or more locations (hereinafter, 'feeding points') electrically coupled to a communication circuit of the electronic device 300 in at least one of the first bezel 310 and the second bezel 320 can be locations where the hinge 33 has not been extended.

According to an example embodiment, to improve the degradation of the antenna radiation performance caused by the hinge 33 or to secure a desired antenna radiation performance, one or more locations (hereinafter, 'grounding points') electrically coupled to a ground member of the electronic device 300 in 10 at least one of the first bezel 310 and the second bezel 320 can be locations where the hinge 33 has not been extended.

Figure 4A:
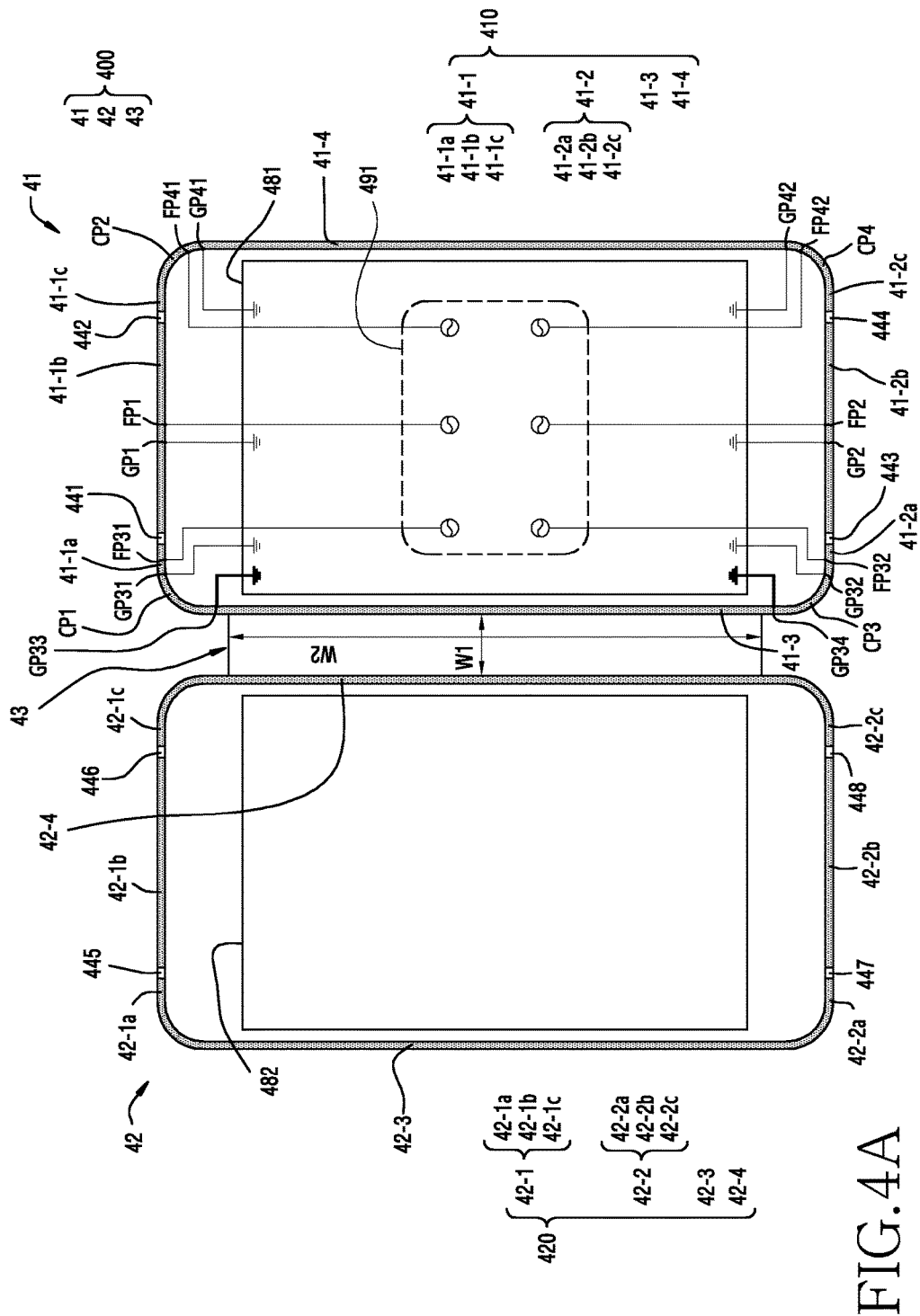
FIGS. 4A and 4B are diagrams illustrating an example circuit of a foldable electronic device that uses a metal frame as an antenna according to an example embodiment of the present disclosure.
Figure 4B:
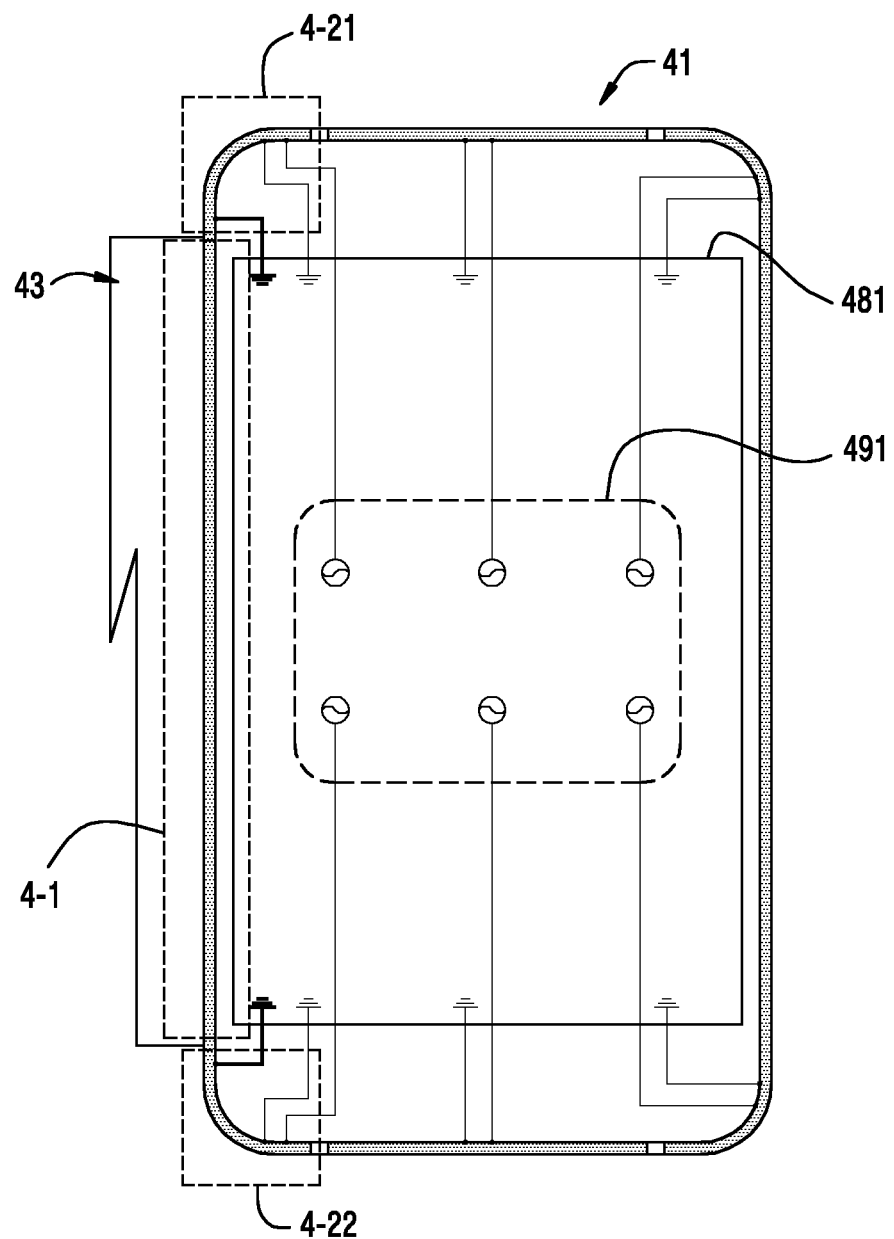

FIGS. 4A and 4B are diagrams illustrating an example circuit of a foldable electronic device that uses a metal frame as an antenna according to an example embodiment of the present disclosure. According to various example embodiments, the foldable electronic device 400 can include at least some of the elements of the electronic device 101 of FIG. 1 or the electronic device 201 of FIG. 2. According to various example embodiments, the foldable electronic device 400 can include at least some of the elements of the foldable electronic device 300 of FIGS. 3A to 3E.

Referring to FIGS. 4A and 4B, the foldable electronic device 400 can include a first electronic device 41, a second electronic device 42 and a hinge (or coupling part) 43. The second electronic device 42 can use the hinge 43 to rotate with respect to the first electronic device 41.

According to an example embodiment, the electronic device 400 can include a first bezel 410 that forms at least a part of an exterior of the first electronic device 41. The first bezel 410 can include a 1-1 metal frame 41-1, a 1-2 metal frame 41-2, a 1-3 metal frame 41-3 and a 1-4 metal frame 41-4, and can be a ring shape of an approximately rectangular form. According to various example embodiments, the 1-1 metal frame 41-1, the 1-2 metal frame 41-2, the 1-3 metal frame 41-3 and the 1-4 metal frame 41-4 of the first bezel 410 can be similar to or be substantially the same as the 1-1 metal frame 31-1, the 1-2 metal frame 31-2, the 1-3 metal frame 31-3 and the 1-4 metal frame 31-4 of the first bezel 310 of FIGS. 3A to 3E, and a description of these is omitted.

According to an example embodiment, the electronic device 400 can include a second bezel 420 that forms at least a part of an exterior of the second electronic device 42. The second bezel 420 can include a 2-1 metal frame 42-1, a 2-2 metal frame 42-2, a 2-3 metal frame 42-3 and a 2-4 metal frame 42-4, and can be a ring shape of an approximately rectangular form. According to various example embodiments, the 2-1 metal frame 42-1, the 2-2 metal frame 42-2, the 2-3 metal frame 42-3 and the 2-4 metal frame 42-4 of the second bezel 420 can be similar to or be substantially the same as the 2-1 metal frame 32-1, the 2-2 metal frame 32-2, the 2-3 metal frame 32-3 and the 2-4 metal frame 32-4 of the second bezel 320 of FIGS. 3A to 3E, and a description of these is omitted.

According to an example embodiment, the electronic device 400 can include a first nonconductive member 441 that is arranged in a gap between a 1-1a metal frame 41-1a of the first bezel 410 and a 1-1b metal frame 41-1b thereof. The electronic device 400 can include a second nonconductive member 442 that is arranged in a gap between the 1-1b metal frame 41-1b of the first bezel 410 and a 1-1c metal frame 41-1c thereof. The electronic device 400 can include a 3rd nonconductive member 443 that is arranged in a gap between a 1-2a metal frame 41-2a of the first bezel 410 and a 1-2b metal frame 41-2b thereof. The electronic device 400 can include a 4th nonconductive member 444 that is arranged in a gap between the 1-2b metal frame 41-2b of the first bezel 410 and a 1-2c metal frame 41-2c thereof. According to various example embodiments, the first nonconductive member 441, the second nonconductive member 442, the 3rd nonconductive member 443 and the 4th nonconductive member 444 can be similar to or be substantially the same as the first nonconductive member 341, the second nonconductive member 342, the 3rd nonconductive member 343 and the 4th nonconductive member 344 of FIGS. 3A to 3E, respectively, and a description of these is omitted.

According to an example embodiment, the electronic device 400 can include a 5th nonconductive member 445 that is arranged in a gap between a 2-1 a metal frame 42-1a of the second bezel 420 and a 2-1b metal frame 42-1b thereof. The electronic device 400 can include a 6th nonconductive member 446 that is arranged in a gap between the 2-1b metal frame 42-1b of the second bezel 420 and a 2-1c metal frame 42-1c thereof. The electronic device 400 can include a 7th nonconductive member 447 that is arranged in a gap between a 2-2a metal frame 42-2a of the second bezel 420 and a 2-2b metal frame 42-2b thereof. The electronic device 400 can include an 8th nonconductive member 448 that is arranged in a gap between the 2-2b metal frame 42-2b of the second bezel 420 and a 2-2c metal frame 42-2c thereof. According to various example embodiments, the 5th nonconductive member 445, the 6th nonconductive member 446, the 7th nonconductive member 447 and the 8th nonconductive member 448 can be similar to or be substantially the same as the 5th nonconductive member 345, the 6th nonconductive member 346, the 7th nonconductive member 347 and the 8th nonconductive member 348 of FIGS. 3A to 3E, respectively, and a description of these is omitted.

According to an example embodiment, the hinge 43 can couple the 1-3 metal frame 41-3 of the first bezel 410 of the first electronic device 41 and the 2-4 metal frame 42-4 of the second bezel 420 of the second electronic device 42. The hinge 43 can have a first width (W1) that extends in a first direction corresponding to a gap between the 1-3 metal frame 41-3 of the first bezel 410 and the 2-4 metal frame 42-4 of the second bezel 420. Or, the hinge 43 can have a second width (W2) that extends in a second direction orthogonal to the first direction. For instance, in an unfolding state, the hinge 43 can be an approximately rectangular form having the first width (W1) and the second width (W2).

According to various example embodiments, the hinge 43 is not limited to the form proposed in the drawings, and can be formed in other various forms.

At least a part of the first bezel 410 can be electrically coupled to a communication circuit 491 of the first electronic device 41. The communication circuit 491 can be mounted on a non-shown PCB of the first electronic device 41. According to various example embodiments, the at least part of the first bezel 410 can be electrically coupled to a ground member (e.g., the ground 481 of the PCB) of the first electronic device 41. According to various example embodiments, the at least part of the first bezel 410 can be formed in an electrical floating state as well.

According to an example embodiment, the 1-1b metal frame 41-1b (hereinafter, 'first antenna') of the 1-1 metal frame 41-1 can be electrically coupled to the communication circuit 491 of the first electronic device 41 in at least one feeding point (FP1). The first antenna 41-1b can be electrically coupled to the ground member 481 of the first electronic device 41 in at least one grounding point (GP1). The communication circuit 491 provides an electrical current to the first antenna 41-1b. While the electric current is circulated along the first antenna 41-1b and is introduced into the ground member 481 of the first electronic device 41, a transmission line capable of transmitting/receiving a wireless electromagnetic wave can be formed.

According to an example embodiment, the 1-2b metal frame 41-2b (hereinafter, 'second antenna') of the 1-2 metal frame 41-2 can be electrically coupled to the communication circuit 491 of the first electronic device 41 in at least one feeding point (FP2). The second antenna 41-2b can be electrically coupled to the ground member 481 of the first electronic device 41 in at least one grounding point (GP2). The communication circuit 491 provides an electrical current to the second antenna 41-2b. While the electric current is circulated along the 1-2b metal frame 41-2b and is introduced into the ground member 481 of the first electronic device 41, a transmission line capable of transmitting/receiving a wireless electromagnetic wave can be formed.

According to an example embodiment, a one-piece metal frame (hereinafter, '4th antenna') including the 1-1c metal frame 41-1c of the 1-1 metal frame 41-1, the 1-4 metal frame 41-4 and the 1-2c metal frame 41-2c of the 1-2 metal frame 41-2 can be electrically coupled to the communication circuit 491 of the first electronic device 41 in at least one feeding point (FP41 or FP42). The 4th antenna 41-1c, 41-4 and 41-2c can be electrically coupled to the ground member 481 of the first electronic device 41 in at least one grounding point (GP41 or GP42). The communication circuit 491 provides an electrical current to the 4th antenna 41-1c, 41-4 and 41-2c. While the electric current is circulated along the 4th antenna 41-1c, 41-4 and 41-2c and is introduced into the ground member 481 of the first electronic device 41, a transmission line capable of transmitting/receiving a wireless electromagnetic wave can be formed. According to various example embodiments, one feeding point (FP41) can be arranged at or around a second corner part (CP2) at which the 1-1 metal frame 41-1 and the 1-4 metal frame 41-4 are coupled, and the other one feeding pint (FP42) can be arranged at or around a 4th corner part (CP4) at which the 1-2 metal frame 41-2 and the 1-4 metal frame 41-4 are coupled. According to various example embodiments, one grounding point (GP41) can be arranged at or around the second corner part (CP2), and the other one grounding point (GP42) can be arranged at or around the 4th corner part (CP4).

According to an example embodiment, a one-piece metal frame (hereinafter, a '3rd antenna') including the 1-1a metal frame 41-1a of the 1-1 metal frame 41-1, the 1-3 metal frame 41-3 and the 1-2a metal frame 41-2a of the 1-2 metal frame 41-2 can be electrically coupled to the communication circuit 491 of the first electronic device 41 in at least one feeding point (FP31 or FP32). The 3rd antenna 41-1a, 41-3 and 41-2a can be electrically coupled to the ground member 481 of the first electronic device 41 in at least one grounding point (GP31 or GP32). The communication circuit 491 provides an electrical current to the 3rd antenna 41-1a, 41-3 and 41-2a. While the electric current is circulated along the 3rd antenna 41-1a, 41-3 and 41-2a and is introduced into the ground member 481 of the first electronic device 41, a transmission line capable of transmitting/receiving a wireless electromagnetic wave can be formed.

According to an example embodiment, at least one antenna (e.g., 3rd antenna 41-1a, 41-3 and 41-2a) of the first bezel 410 can have the influence of radiation from the hinge 43 installed adjacently to the first bezel 410.

According to an example embodiment, in the first folding state (referring to FIG. 3D) or the second folding state (referring to FIG. 3E), the first bezel 410 of the first electronic device 41 and the second bezel 420 of the second electronic device 42 can abut on each other. For example, in the first folding state or the second folding state, the 1-1 metal frame 41-1 of the first bezel 410 and the 2-1 metal frame 42-1 of the second bezel 420 can abut on each other. In the first folding state or the second folding state, the 1-2 metal frame 41-2 of the first bezel 410 and the 2-2 metal frame 42-2 of the second bezel 420 can abut on each other. In the first folding state or the second folding state, the 1-4 metal frame 41-4 of the first bezel 410 and the 2-3 metal frame 42-3 of the second bezel 420 can abut on each other. According to various example embodiments, in the first folding state or the second folding state, the 1-3 metal frame 41-3 of the first bezel 410 and the 2-4 metal frame 42-4 of the second bezel 420 can abut on each other.

For example, in the first folding state (e.g., referring to FIG. 3D) or the second folding state (e.g., referring to FIG. 3E), the first antenna 41-1b, the second antenna 41-2b, the 3rd antenna 41-1a, 41-3 and 41-2a, or the 4th antenna 41-1c, 41-4 and 41-2c of the first bezel 410 can have the influence of radiation from the second bezel 420 arranged adjacently to the first bezel 410.

According to an example embodiment, to improve the degradation of antenna radiation performance caused by the hinge 43 or improve a negative radiation influence of the second bezel 420 on the first bezel 410 in the folding state, the hinge 43 can be formed to decrease a size of the hinge 43 that couples the first electronic device 41 and the second electronic device 42. For example, the hinge 43 can be formed not to be extended to or around the first corner part (CP1) at which the 1-1 metal frame 41-1 and the 1-3 metal frame 41-3 of the first bezel 410 are coupled. According to various example embodiments, the hinge 43 can be formed not to be extended to or around the second corner part (CP2) at which the 1-2 metal frame 41-2 and the 1-3 metal frame 41-3 of the first bezel 310 are coupled.

According to an example embodiment, to improve the degradation of the antenna radiation performance caused by the hinge 43 or improve the negative radiation influence of the second bezel 420 on the first bezel 410 in the folding state, at least one feeding point (FP31 or FP32) of the 3rd antenna 41-1a, 41-3 or 41-2a abutting on the hinge 43 can be located at or around the corner parts (CP1 and CP3) to which the hinge 43 is not extended.

According to an example embodiment, to improve the degradation of the antenna radiation performance caused by the hinge 43 or improve the negative radiation influence of the second bezel 420 on the first bezel 410 in the folding state, at least one grounding point (GP31 or GP32) of the 3rd antenna 41-1a, 41-3 or 42-1a abutting on the hinge 43 can be located at the corner parts (CP1 and CP3) to which the hinge 43 is not extended, or around the corner parts (CP1 and CP3).

According to an example embodiment, to improve the degradation of the antenna radiation performance caused by the hinge 43 or improve the negative radiation influence of the second bezel 420 on the first bezel 410 in the folding state, another at least one grounding point (GP33 or GP34) of the 3rd antenna 41-1a, 41-3 or 41-2a can be located near the hinge 43.

For example, referring to FIG. 4B, the 3rd antenna 41-1a, 41-3 and 41-2a can include a first part 4-1 abutting on the hinge 43, and other second parts 4-21 and 4-22. At least one feeding point and at least on grounding point of the 3rd antenna 41-1a, 41-3 and 41-2a can be configured as mentioned above. This can decrease an electromagnetic influence that the second parts 4-21 and 4-22 of the 3rd antenna 41-1a, 41-3 and 41-2a have from the hinge 43.

According to various example embodiments, the second electronic device 42 can include a similar construction to at least a part of the first electronic device 41.

According to an example embodiment, as described above, in the folding state, a negative radiation influence of the second bezel 420 on the first bezel 410 can be generated. According to various example embodiments, to improve the negative radiation influence of the second bezel 420 on the first bezel 410 in the folding state, the electronic device 400 can selectively form at least a part of the second bezel 420 in the first state, the second state or the 3rd state.

According to an example embodiment, to improve the negative radiation influence of the second bezel 420 on the first bezel 410 in the folding state, a 2-1b metal frame 42-1b of a 2-1 metal frame 42-1 can be electrically coupled to a ground member 482 of the second electronic device 42 in at least one location. According to various example embodiments, to improve the negative radiation influence of the second bezel 420 on the first bezel 410 in the folding state, a 2-2b metal frame 42-2b of a 2-2 metal frame 42-2 can be electrically coupled to the ground member 482 of the second electronic device 42 in at least one location. According to various example embodiments, to improve the negative radiation influence of the second bezel 420 on the first bezel 410 in the folding state, a metal frame including a 2-1a metal frame 42-1a of the 2-1 metal frame 42-1, a 2-3 metal frame 42-3 and a 2-2a metal frame 42-2a of the 2-2 metal frame 42-2 can be electrically coupled to the ground member 482 of the second electronic device 42 in at least one location. According to various example embodiments, to improve the negative radiation influence of the second bezel 420 on the first bezel 410 in the folding state, a metal frame including a 2-1c metal frame 42-1c of the 2-1 metal frame 42-1a, a 2-4 metal frame 42-4 and a 2-2c metal frame 42-2c of the 2-2 metal frame 42-2 can be electrically coupled to the ground member 482 of the second electronic device 42 in at least one location.

According to another example embodiment, to improve the negative radiation influence of the second bezel 420 on the first bezel 410 in the folding state, the 2-1b metal frame 42-1b of the 2-1 metal frame 42-1 can be formed in an electrical floating state. According to various example embodiments, the 2-2b metal frame 42-2b of the 2-2 metal frame 42-2 can be formed in the electrical floating state.

For example, in the first folding state or the second folding state, the 1-1b metal frame 41-1b (or 'first antenna') of the first bezel 410 and the 2-1b metal frame 42-1b of the second bezel 420 can abut on each other. In the first folding state or the second folding state, the 1-1b metal frame 41-1b of the first bezel 410 is eletromagnetically coupled with the 2-1b metal frame 42-1b of the electrical floating state of the second bezel 420 and thus, a desired or improved radiation performance can be secured.

For another example, in the first folding state or the second folding state, the 1-2b metal frame 41-2b (or 'second antenna') of the first bezel 410 and the 2-2b metal frame 42-2b of the second bezel 420 can abut on each other. In the first folding state or the second folding state, the 1-2b metal frame 41-2b of the first bezel 410 is eletromagnetically coupled with the 2-2b metal frame 42-2b of the electrical floating state of the second bezel 420 and thus, a desired or improved radiation performance can be secured.

According to various example embodiments, a metal frame including the 2-1a metal frame 42-1a of the 2-1 metal frame 42-1, the 2-3 metal frame 42-3 and the 2-2a metal frame 42-2a of the 2-2 metal frame 42-2 can be formed in the electrical floating state. According to various example embodiments, a metal frame including the 2-1c metal frame 42-1c of the 2-1 metal frame 42-1, the 2-4 metal frame 42-4 and the 2-2c metal frame 42-2c of the 2-2 metal frame 42-2 can be formed in the electrical floating state.

For example, in the first folding state or the second folding state, the 3rd antenna 41-1a, 41-3 and 41-2a of the first bezel 410 and a part (e.g., the 2-1c metal frame 42-1c, the 2-4 metal frame 42-4 and the 2-2c metal frame 42-2c) of the second bezel 420 can abut on each other. In the first folding state or the second folding state, the 3rd antenna 41-1a, 41-3 and 41-2a of the first bezel 410 are eletromagnetically coupled with the part (e.g., 42-1c, 42-4 and 42-2c) of the electrical floating state of the second bezel 420 and thus, a desired or improved radiation performance can be secured.

For another example, in the first folding state or the second folding state, the 4th antenna 41-1c, 41-4 and 41-2c of the first bezel 410 and a part (e.g., the 2-1a metal frame 42-1a, the 2-3 metal frame 42-3 and the 2-2a metal frame 42-2a) of the second bezel 420 can abut on each other. In the first folding state or the second folding state, the 4th antenna 41-1c, 41-4 and 41-2c of the first bezel 410 are eletromagnetically coupled with the part (e.g., 42-1a, 42-3 and 42-2a) of the electrical floating state of the second bezel 420 and thus, a desired or improved radiation performance can be secured.

According to various example embodiments, the electronic device 400 can further include a sensor circuit (not shown) that can acquire information of various forms being a factor of changing antenna radiation performance. For example, the sensor circuit can sense a transformation state (e.g., the first folding state, the second folding state, a state in which the electronic device 400 is unfolded, etc.) of the electronic device 400. Or, the sensor circuit can measure an antenna signal strength of the electronic device 400. Or, the sensor circuit can measure whether an object such as the user's body, etc. gets in proximity to the electronic device 400, or a proximity degree. Or, the sensor circuit can measure whether the electronic device 400 is held by a user's hand, or a holding degree as well. In addition to this, the sensor circuit can acquire information of various forms associated with antenna radiation performance.

According to an example embodiment, the control circuit of the electronic device 400 can form at least a part of the bezel 410 or 420 in the first state, the second state or the 3rd state on the basis of at least a part of the information acquired through the sensor circuit, to secure a desired radiation performance.

For example, the control circuit of the electronic device 400 can sense the transformation state (e.g., the first folding state, the second folding state, the state in which the electronic device 400 is unfolded, etc.) of the electronic device 400 through the sensor circuit and accordingly to this, the control circuit can form at least a part of the bezel 410 or 420 in the first state, the second state or the 3rd state, to secure a desired radiation performance. For example, for the sake of the first state, the control circuit can selectively couple at least one point of the bezel 410 or 420 to a feeding part of the electronic device 400. For another example, for the sake of the second state, the control circuit can selectively couple at least one point of the bezel 410 or 420 to a ground member of the electronic device 400. For a further example, for the sake of the 3rd state, the control circuit can form at least a part of the bezel 410 or 420 selectively in the electrical floating state as well.

The term "module" used in the present disclosure includes a unit comprising hardware, software or firmware, or any combination thereof, and can be, for example, used interchangeably with the terms "logic", "logic block", "component", "circuit", etc. The "module" can be an integrally configured component or the minimum unit performing one or more functions or a part thereof. The "module" can be implemented mechanically or electronically and can, for example, and without limitation, include a dedicated processor, a CPU, an Application-Specific Integrated Circuit (ASIC) chip, Field-Programmable Gate Arrays (FPGAs), or a programmable logic device, which have been known or will be developed in future, performing some operations.

At least a part of a device (e.g., modules or functions thereof) or method (e.g., operations) according to various example embodiments can be implemented as an instruction that is stored in a computer-readable storage media (e.g., the memory 130 of FIG. 1 or the memory 230 of FIG. 2) in the form of a program module. In case where the instruction is executed by the processor (e.g., the processor 120 of FIG. 1 or the processor 210 of FIG. 2), the processor can perform a function corresponding to the instruction. The computer-readable recording media can include a hard disk, a floppy disk, a magnetic media (e.g., a magnetic tape), an optical recording media (e.g., a Compact Disc—Read Only Memory (CD-ROM) and/or a Digital Versatile Disk (DVD)), a Magneto-Optical Media (e.g., a floptical disk), an internal memory, etc. The instruction can include a code made by a compiler or a code executable by an interpreter.

The module or program module according to various example embodiments can further include at least one or more of the aforementioned elements, or omit a part, or further include another element. Operations carried out by the module, the program module or the another constituent element according to various example embodiments can be executed in a sequential, parallel, repeated or heuristic manner, or at least some operations can be executed in different order or can be omitted, or another operation can be added.

According to an example embodiment, an electronic device can include a housing portion including a first housing portion including a first surface, a second surface looking opposite to the first surface, and a first side surface at least partially surrounding a space between the first surface and the second surface, and a second housing portion including a first surface that is capable of being oriented to face the first surface of the first housing portion, a second surface looking opposite to the first surface, and a second side surface at least partially surrounding a space between the first surface and the second surface, a coupling part coupling the first housing portion and the second housing portion, a communication circuit arranged within the housing portion, a ground member arranged within the housing portion, a first conductive member extended along at least a part of the first side surface, the first conductive member including at least one first gap that electrically isolates portions of the first conductive member, and a second conductive member extended along at least a part of the second side surface, the second conductive member including at least one second gap that electrically isolates portions of the second conductive member. At least one of the first housing portion or the second housing portion can include a region where the coupling part is combined between a first corner part and a second corner part. The first conductive member can include one or more first points electrically coupled to the communication circuit, and one or more second points electrically coupled to the ground member. The one or more first points or the one or more second points may be not located in the region where the coupling part is combined. One of the one or more second points can abut on the region where the coupling part is combined.

According to an example embodiment, at least one of the one or more first points can be located in the first corner part or the second corner part.

According to an example embodiment, at least one of the first gap or the second gap may not be formed in a portion that couples between the first corner part and the second corner part.

According to an example embodiment, at least a part of the coupling part can include metal materials.

According to an example embodiment, the second conductive member may not be electrically coupled to the communication circuit.

According to an example embodiment, a part of electrically isolated portions of the second conductive member can be electrically coupled to the ground member.

According to an example embodiment, a part of the electrically isolated portions of the second conductive member can be in an electrical floating state.

According to an example embodiment, at least one of the first conductive member or the second conductive member can include a first metal frame, a second metal frame extended opposite the first metal frame, a 3rd metal frame coupling one end part of the first metal frame and one end part of the second metal frame, and a 4th metal frame coupling the other end part of the first metal frame and the other end part of the second metal frame.

According to an example embodiment, the first corner part can be at least one portion that couples the first metal frame and the 3rd metal frame, and the second corner part can be at least one portion that couples the second metal frame and the 3rd metal frame.

According to an example embodiment, the coupling part can be coupled to the 3rd metal frame.

According to an example embodiment, two gaps can be provided in each of the first metal frame and the second metal frame.

According to an example embodiment, at least one of the first housing portion or the second housing portion can include a display.

According to an example embodiment, the ground member can include the ground of a Printed Circuit Board (PCB) mounted in the electronic device.

According to an example embodiment, the first gap and the second gap can be substantially aligned, when viewing from the side surface of the first or second housing portion, in a state the first surface of the second housing portion faces the first surface of the first housing portion.

According to an example embodiment, the electronic device can include a first nonconductive member at least partially filing at least one first gap of the first conductive member, and a second nonconductive member at least partially filling at least one first gap of the second conductive member.

A foldable electronic device according to various example embodiments of the present disclosure can improve the degradation of antenna radiation performance, by using at least a part of an exterior metal frame as an antenna.

Each of the elements described in the present disclosure can include one or more components, and a name of the corresponding element can become different according to the kind of the electronic device 100. In various example embodiments, the electronic device 100 can include at least one of the elements described in the present disclosure, and can omit some elements or further include another additional element. Also, some of the elements of the electronic device 100 according to various example embodiments can be combined and configured as one entity, thereby identically performing the functions of the corresponding elements before combination.

What is claimed is:

1. An electronic device comprising:
    a first housing comprising:
        a first surface facing a first direction, a second surface facing a second direction opposite the first direction, and a first side surface at least partially surrounding a space between the first surface and the second surface; and
    a second housing comprising:
        a first surface that is capable of facing the first surface of the first housing, a second surface facing a direction opposite to the first surface of the second housing, and a second side surface at least partially surrounding a space between the first surface and the second surface of the second housing;
    a connection configured to couple the first housing and the second housing;
    a communication circuit arranged within the first housing;
    a ground arranged within the first housing;
    a first conductive member extending along at least a part of the first side surface, the first conductive member comprising at least one first gap configured to electrically isolate portions of the first conductive member; and
    a second conductive member extending along at least a part of the second side surface, the second conductive member comprising at least one second gap configured to electrically isolate portions of the second conductive member,
    wherein at least one of the first housing and the second housing comprises a region where the connection is combined between a first corner and a second corner of the first or second housings,
    the first conductive member comprises:
        one or more first points electrically coupled to the communication circuit; and
        one or more second points electrically coupled to the ground,
    the one or more first points or the one or more second points are located in a region of the first conductive member other than a region where the connection is combined, and
    one of the one or more second points abuts the region of the first conductive member where the connection is combined.

2. The device of claim 1, wherein at least one of the one or more first points is located in the first corner part or the second corner part.

3. The device of claim 1, wherein at least one of the first gap or the second gap is not formed in a portion that combines the first corner part and the second corner part.

4. The device of claim 1, wherein at least a part of the connection comprises metal materials.

5. The device of claim 1, wherein the second conductive member is not electrically coupled to the communication circuit.

6. The device of claim 5, wherein a part of the electrically isolated portions of the second conductive member is electrically coupled to the ground.

7. The device of claim 5, wherein a part of the electrically isolated portions of the second conductive member is in an electrical floating state.

8. The device of claim 1, wherein at least one of the first conductive member or the second conductive member comprises:
    a first metal frame;
    a second metal frame extending opposite the first metal frame;
    a 3rd metal frame coupling one end of the first metal frame and one end of the second metal frame; and
    a 4th metal frame coupling another end part of the first metal frame and another end part of the second metal frame.

9. The device of claim 8, wherein the first corner comprises at least one portion that couples the first metal frame and the 3rd metal frame, and
    the second corner comprises at least one portion that couples the second metal frame and the 3rd metal frame.

10. The device of claim 9, wherein the connection is coupled to the 3rd metal frame.

11. The device of claim 9, wherein two gaps are provided in each of the first metal frame and the second metal frame.

12. The device of claim 1, wherein at least one of the first housing or the second housing comprises a display.

13. The device of claim 1, wherein the ground comprises a ground of a Printed Circuit Board (PCB) mounted in the electronic device.

14. The device of claim 1, wherein the first gap and the second gap are substantially aligned, when viewed from the side surface of the first or second housing portion, in a state in which the first surface of the second housing faces the first surface of the first housing.

15. The device of claim 1, further comprising:
    a first nonconductive material at least partially filling at least one first gap of the first conductive member; and a second nonconductive material at least partially filling at least one first gap of the second conductive member.

\* \* \* \* \*